US012527516B2

(12) United States Patent
Pierangelo et al.

(10) Patent No.: US 12,527,516 B2
(45) Date of Patent: Jan. 20, 2026

(54) METHOD AND APPARATUS FOR QUANTIFYING THE PROGRESSION OF A PREGNANCY

(71) Applicants:ECOLE POLYTECHNIQUE, Palaiseau (FR); CENTRE NATIONAL DE LA RECHERCHE SCIENTIFIQUE, Paris (FR); CHU BRUGMANN, Brussels (BE)

(72) Inventors: Angelo Pierangelo, Palaiseau (FR); Jérémy Vizet, Les Mureaux (FR); Jean Rehbinder, Illkirch (FR); André Nazac, Brussels (BE)

(73) Assignees: CENTRE NATIONAL DE LA RECHERCHE SCIENTIFIQUE, Paris (FR); ECOLE POLYTECHNIQUE, Palaiseau (FR); CHU BRUGMANN, Brussels (BE)

( * ) Notice: Subject to any disclaimer, the term of this patent is extended or adjusted under 35 U.S.C. 154(b) by 916 days.

(21) Appl. No.: 17/621,366

(22) PCT Filed: Jun. 29, 2020

(86) PCT No.: PCT/EP2020/068204
§ 371 (c)(1),
(2) Date: Dec. 21, 2021

(87) PCT Pub. No.: WO2021/008861
PCT Pub. Date: Jan. 21, 2021

(65) Prior Publication Data
US 2022/0370002 A1 Nov. 24, 2022

(30) Foreign Application Priority Data

Jul. 16, 2019 (EP) ..................................... 19290057

(51) Int. Cl.
*A61B 5/00* (2006.01)
*A61B 1/00* (2006.01)
(Continued)

(52) U.S. Cl.
CPC .......... *A61B 5/435* (2013.01); *A61B 1/00009* (2013.01); *A61B 1/0638* (2013.01);
(Continued)

(58) Field of Classification Search
None
See application file for complete search history.

(56) References Cited

U.S. PATENT DOCUMENTS

2018/0271430 A1* 9/2018 Ramella-Roman .... A61B 5/435

FOREIGN PATENT DOCUMENTS

EP          1 738 682 A1      1/2007

OTHER PUBLICATIONS

Lippok, N., Villiger, M., & Bouma, B. E. (2015). Degree of polarization (uniformity) and depolarization index: unambiguous depolarization contrast for optical coherence tomography. Optics letters, 40(17), 3954-3957. (Year: 2015).*

(Continued)

*Primary Examiner* — Christopher Koharski
*Assistant Examiner* — Renee C Langhals
(74) *Attorney, Agent, or Firm* — Baker Hostetler

(57) ABSTRACT

A method of quantifying progression of pregnancy, includes a) illuminating a uterine cervix with polarized light having a wavelength comprised between 600 and 1100 nm; b) acquiring a plurality of images of the illuminated uterine cervix through a polarization state analyser in respective analysing states; steps a) and b) being performed either once or a plurality of time using polarized light having different polarization states; c) from the acquired images, computing a depolarization parameter over a region of interest of the uterine cervix; and d) quantifying the progression of the pregnancy from said depolarization parameter. An apparatus, based on a colposcope fitted with a controllable polarization state generator, a controllable polarization state analyser and a suitably-programmed computer, for carrying out such a method. A computer program for carrying out such a method.

11 Claims, 16 Drawing Sheets

Figure 1:
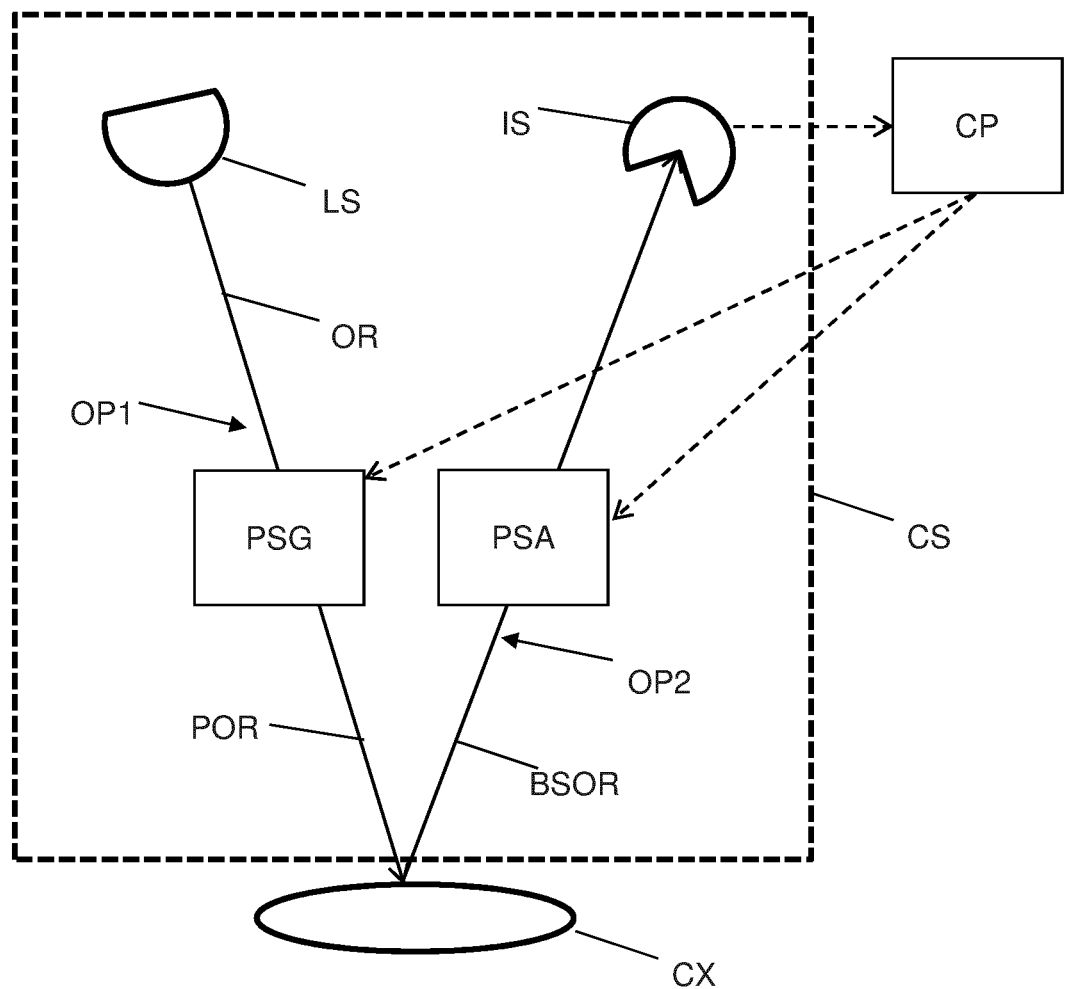

(51) Int. Cl.
*A61B 1/06* (2006.01)
*A61B 1/303* (2006.01)
(52) U.S. Cl.
CPC ............ *A61B 1/303* (2013.01); *A61B 5/0059* (2013.01); *A61B 5/0075* (2013.01)

(56) References Cited

OTHER PUBLICATIONS

Pierangelo, A., Nazac, A., Benali, A., Validire, P., Cohen, H., Novikova, T., . . . & Martino, A. D. (2013). Polarimetric imaging of uterine cervix: a case study. Optics express, 21(12), 14120-14130. (Year: 2013).*

Lindberg, et al., "Innovative integrated numerical-experimental method for high-performance multispectral Mueller polarimeters based on ferroelectric liquid crystals", Applied Optics, vol. 58, No. 19, Applied Optics 5187, Jul. 1, 2019.

Compain, et al., "General and self-consistent method for the calibration of polarization modulators, polarimeters, and Mueller-matrix ellipsometers", Applied Optics, vol. 38, Issue 16, pp. 3490-3502, 1999.

Lindberg, et al., "Innovative and high-performance instrumentation for biomedical Mueller polarimetric imaging in vivo", Proceedings, vol. 10873, Optical Biopsy XVII, 2019.

Chue-Sang, et al., "Optimization of the incident wavelength in Mueller matrix imaging of cervical collagen", Proceedings of the SPIE, vol. 10478, 2018.

Akins, et al., "Second harmonic generation imaging as a potential tool for staging pregnancy and predicting preterm birth", Journal of Biomedical Optics, vol. 15, Issue 2, 2020.

Rehbinder, et al., "Depolarization imaging for fast and non-invasive monitoring of cervical microstructure remodeling in vivo during pregnancy", Scientific Reports, vol. 12, Article No. 12321, 2022.

* cited by examiner

METHOD AND APPARATUS FOR QUANTIFYING THE PROGRESSION OF A PREGNANCY

CROSS-REFERENCE TO RELATED APPLICATIONS

This application is a National Stage of International patent application PCT/EP2020/068204, filed on Jun. 29, 2020, which claims priority to foreign European patent application No. EP 19290057.9, filed on Jul. 16, 2019, the disclosures of which are incorporated by reference in their entirety.

The invention relates to a method, an apparatus and a computer program for quantifying the progression of a pregnancy. The invention applies to the monitoring of pregnancies in women and in non-human female mammals. More particularly, it applies to the prediction of the remaining time before delivery and the detection of Threat of Premature Birth (TPB), even if it is not limited to this application.

The Threat of Premature Birth (TPB) is the most important complication during pregnancy. It occurs between 23 and 36 amenorrhea weeks and is manifested by uterine contractions associated with modifications in the cervix with or without bleeding and/or premature rupture of the membranes. In the absence of medical intervention by tocolysis, the installation of regular uterine contractions may result in premature delivery. However, for women diagnosed with TPB, actual premature delivery occurs in 15% to 50% of the cases.

The most widely-used technique to diagnose and evaluate the severity of the TPB is the transvaginal ultrasound of the cervix. This technique, which involves measuring the cervical length, has been recommended since 2002 by the French National College of Obstetricians and Gynaecologists ("Collège National des Gynécologues et Obstétriciens de France"). However, due to the imperfect correlation between this measurement and the time remaining before birth, the choice of a threshold for the cervical length used to detect a preterm delivery is strongly practitioner-dependent. Consequently, a large percentage of women suspected of TPB undergoes unnecessary hospitalization, which is costly and can feature specific complications, like thromboembolic risks due to bed confinement, as well as side effects of tocolytic treatments. Finally, it is worth mentioning that prematurity remains a major health problem worldwide due to the inadequacy of current medical procedures used to prevent and manage it.

US 2018/0271430 discloses methods and apparatuses for measuring collagen organization in the uterine cervix using polarimetry. The document suggests that the disclosed methods and apparatuses may allow assessing TPB, but fails to identify specific polarimetry measurements associated with it—let alone quantifying the progression of a pregnancy or predicting the remaining time before delivery. Indeed, the dynamics describing the cervical microstructure modification during pregnancy is not very well-known due to the lack of a non-invasive technique enabling to explore this process throughout the entire gestation. Therefore, relating collagen microstructure remodelling to pregnancy progression or TPB is far from being straightforward.

The present inventors have demonstrated that depolarization of light from the uterine cervix of a pregnant woman is strongly correlated to the progression of pregnancy, expressed by a number of weeks of amenorrhea. This may be explained by the fact that depolarization carries information on volumetric scattering properties of biological tissues, such as the uterine cervix, and therefore on micro-scale modifications of their structure. Such modifications presumably arise throughout the pregnancy and accelerate in its late stages. Their cause and nature are imperfectly known.

The inventors have also demonstrated that the better results are obtained using light having a wavelength comprised between 600 and 1100 nm (preferably between 600 and 1000 nm, even more preferably between 650 nm and 1000 nm). Longer wavelengths are strongly attenuated by water in tissues. Much shorter wavelengths are strongly absorbed by haemoglobin and oxyhemoglobin. Surprisingly, radiation in the 400-600 nm range turns out to be ineffective in quantifying the progression of pregnancy. It is worth noting that in US 2018/0271430, 565-570 nm radiation is used.

If the actual number of weeks of amenorrhea is known, a discrepancy between this actual number and the progression quantified by measuring depolarization may be indicative of an abnormal course of pregnancy. For instance, if polarimetry suggests a more advanced pregnancy than the actual number of weeks of amenorrhea, TPB should be suspected.

An object of the present invention is then a method of quantifying progression of pregnancy in a pregnant female mammal, comprising the following steps:
  a) Illuminating the uterine cervix of the pregnant female mammal with polarized light having a wavelength comprised between 600 and 1100 nm;
  b) Acquiring a plurality of images of the illuminated uterine cervix through a polarization state analyser in respective analysing states;
  Steps a) and b) being performed either once or a plurality of time using polarized light having different polarization states;
  c) From the acquired images, computing at least one depolarization parameter over a region of interest of the uterine cervix; and
  d) Quantifying the progression of the pregnancy from said depolarization parameter.

Another object of the invention is an apparatus for quantifying the progression of a pregnancy in a pregnant female mammal, comprising:
  An imaging device comprising:
    a light source for illuminating a uterine cervix with light having a wavelength comprised between 600 and 1100 nm,
    an image sensor for acquiring an image of the illuminated uterine cervix,
    an illumination optical path from the light source and the uterine cervix,
    an imaging optical path between the uterine cervix and the image sensor, the illumination optical path and the imaging optical path being separated from each other over at least one portion thereof,
    a controllable polarization state generator arranged on a portion of the illumination optical path separated from the imaging optical path and
    a controllable polarization state analyser arranged on a portion of the imaging optical path separated from the illumination optical path;
  and
  a computer configured for:
    controlling the polarisation state generator, the polarization state analyser and the image sensor in order to illuminate a uterine cervix with said light having one or more polarization states and, for each said polarization state, acquiring a plurality of images of the uterine cervix with the polarization state analyser in a respective analysing state;

computing at least one depolarization parameter over a region of interest of the uterine cervix from the acquired images, and quantifying the progression of the pregnancy from said depolarization parameter.

Yet another object of the invention is a computer program comprising instructions which, when the program is executed by a computer, cause the computer to acquire, from an imaging device, a plurality of images of an uterine cervix, each acquired image being associated to a polarization state of emitting light and to an analysing state of a polarization analyser, to compute at least one depolarization parameter over a region of interest of the uterine cervix from the acquired images, and to quantify the progression of the pregnancy from said depolarization parameter.

Particular embodiments constitute the subject-matter of the dependent claims.

The inventive method is safe and no more invasive than a conventional colposcopy. Moreover, it does not rely on expensive material (only a conventional colposcope supplemented with a miniaturized polarimeter) and it does not require specific training of the practitioner carrying it out (for the practitioner, the procedure is the same as for a conventional colposcopy).

Figure 2A:
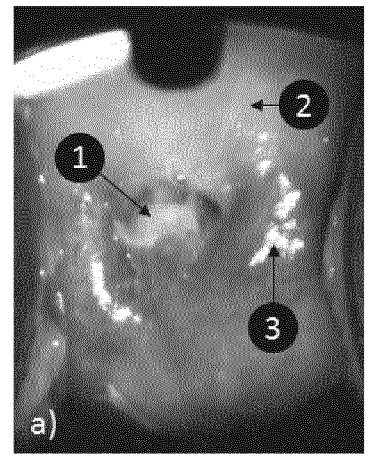
Figure 2B:
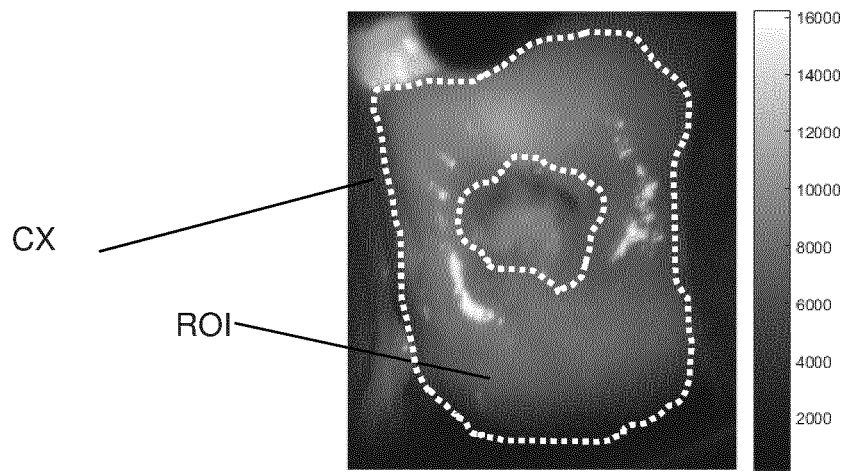
Figure 25:
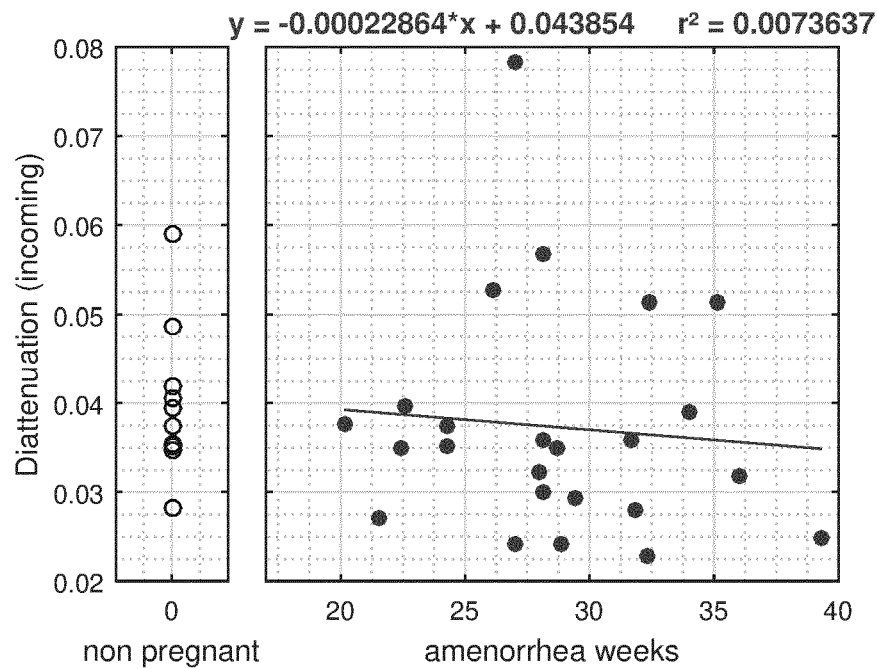
Figure 26:
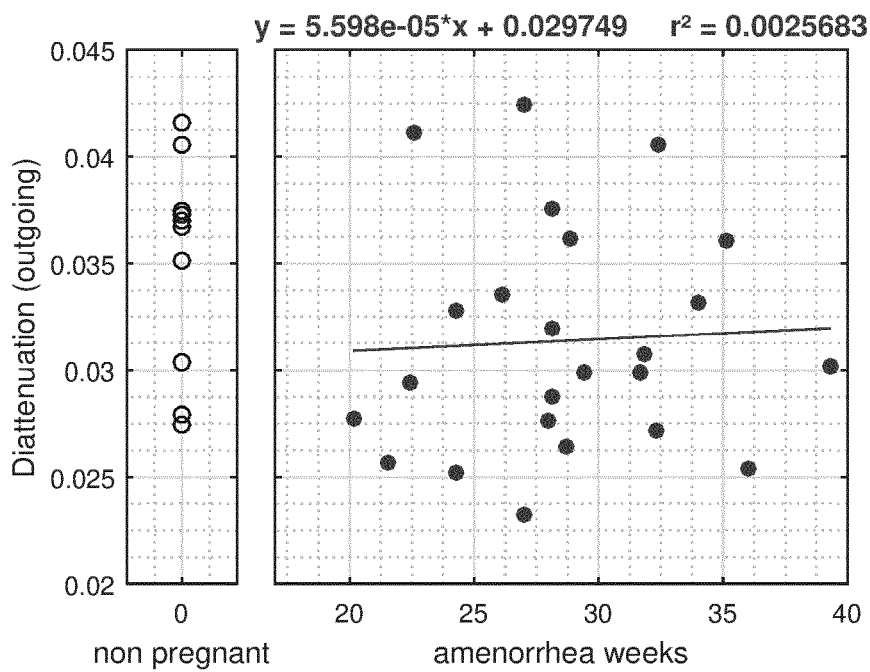
Figure 27:
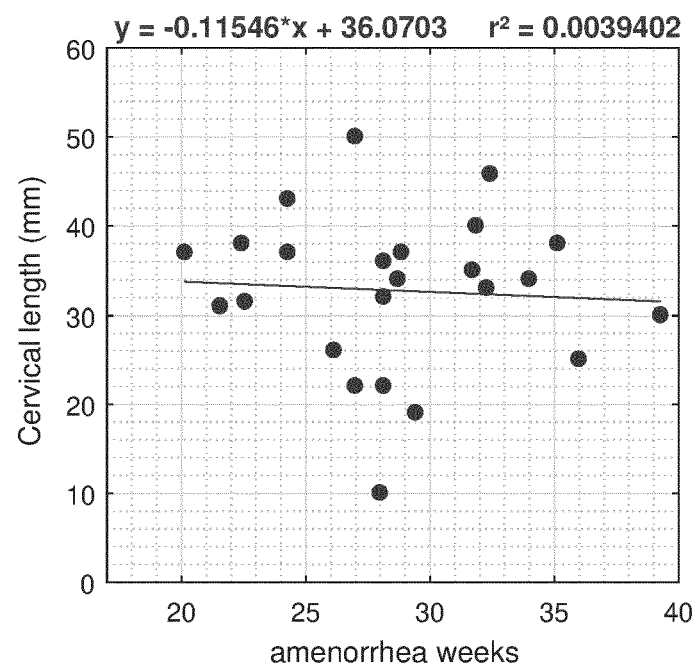

Additional features and advantages of the present invention will become apparent from the subsequent description, taken in conjunction with the accompanying drawings, which show:

FIG. 1, a schematic representation of an apparatus according to an embodiment of the invention;

FIG. 2A, an image of a uterine cervix; FIG. 2B an unpolarized intensity image of the same uterine cervix at 650 nm ($M_{11}$ coefficient of the measured Mueller matrix), on which a region of interest has been selected, and FIG. 2C an image of the polarimetric parameter of total depolarization of the same uterine cervix at 650 nm;

FIGS. 3 to 22B, graphs demonstrating the technical effect of the invention;

FIGS. 23 to 26, graphs demonstrating that—unlike depolarization—retardance and azimuth are poor predictors of the progression of a pregnancy; and FIG. 27, a graph demonstrating that the length of uterine cervix, measured by using transvaginal ultrasound, is uncorrelated with the progression of a pregnancy.

Light is an electromagnetic field described by Maxwell's equations. In free space, the electric and magnetic field simultaneously oscillate in the plane orthogonal to the direction of propagation of light. The polarization is the trajectory that the electric field vector describes over the time in this plane.

If this evolution is deterministic, this trajectory can be a straight line, a circle or an ellipse. This corresponds to linear, circular or elliptical polarization respectively.

If this evolution is non-deterministic, the light is said to be wholly or partly depolarized.

In polarimetric imaging, the observed contrasts are related to the changes induced by a sample on the polarization state of the light used to explore it. Schematically, the elementary polarimetric properties of any sample at a given wavelength are the following:

Depolarization ($\Delta$), which quantifies the "disorder" introduced in the evolution of the light's electric field due to its interaction with a sample. For optically thick tissues, such as cervical issues, this effect occurs mainly related to the multiple scattering, typically due to the presence of cellular or sub-cellular particles or fibers (collagen, elastin, etc.) without a preferential orientation;

Phase retardance (R)— or simply "retardance"—which quantifies the dependence of the refractive index of the sample on the polarization state of light. Samples with nonzero retardance are characterized by two orthogonal polarization eigenstates with different phase shifts but the same attenuation. Typically, one eigenstate corresponds to a linear polarization along a "fast axis" and the other one to a linear polarization along a "slow axis" perpendicular to the fast axis. The retardance quantifies the difference of the phase shift between these two eigenstates. The orientation of these eigenstates—more precisely, the orientation of the "slow axis" or, equivalently, that of the "fast axis"—is named azimuth ($\alpha$). Apart from the noticeable exception of the optical activity, the retardance is related to a spatial anisotropy of the tissue, typically due to the presence of fibers with a preferential orientation (tendons, striated muscles, collagen, etc.);

Diattenuation (D), which quantifies the dependence of the optical attenuation of the sample on the polarization state of light. Samples with nonzero diattenuation are characterized by two orthogonal polarization eigenstates with different attenuations but the same phase shift. Diattenuation enables to quantify the difference of absorption between these two eigenstates. It is generally related to the absorption anisotropy of the tissue.

Several approaches can be used to extract the main polarimetric properties of a sample. One of the most effective is Mueller polarimetry, which is based on the Stokes formalism representing any polarization state of the light as a 4-components intensity vector S.

The advantage of this formalism is that the vector S of a light beam can be experimentally determined through intensity measurements. Any transformation undergone by the polarization state can be represented by a transfer matrix M, called Mueller matrix (4×4 with real coefficients).

For measuring the Mueller matrix M of a sample, the acquisition of at least 16 "raw" intensity images is needed. This can be achieved by using a Polarization State Generator (PSG) which temporally modulates incoming light polarization by generating four independent probing polarization states. These states are described by four Stokes vectors, which are grouped together as the columns of a modulation matrix called W. The light emerging from the sample passes through a Polarization State Analyzer (PSA). Each polarization state of light generated by the PSG is analyzed through four independent configurations of the PSA. These configurations are described by four analysis Stokes vectors, which are grouped as the rows of an analysis matrix called A. Sixteen intensity measurements can thus be performed placing a detector behind the PSA and are staked into a matrix named B which can be expressed as B=AMW. The Mueller matrix M of the explored sample can be easily found by computing $M=A^{-1}BW^{-1}$ where W and A matrices have to be previously retrieved through a calibration procedure, for instance the Eigenvalue Calibration Method (see the paper "General and self-consistent method for the calibration of polarization modulators, polarimeters, and Mueller-matrix ellipsometers", Eric Compain, Stéphane Poirier, and Bernard Drevillon, Applied Optics, 38, 16, 3490-3502 (1999)) which makes it possible to calibrate a Mueller polarimetric system without any detailed modeling of its optical components.

For an imaging system, the described procedure is performed for each pixel of the CCD camera and a Mueller polarimetric image of the explored sample is obtained (i.e. a Mueller matrix is associated to each pixel).

Mueller polarimetric imaging is an extremely powerful technique because it enables simultaneous measurement of all elementary polarimetric properties of a sample (depolarization, retardance and diattenuation). Particular algebraic treatments are needed for decomposing such Mueller matrices in the product of Mueller matrices of elementary polarimetric effects. One of the most widely used algebraic methods is the Lu-Chipman decomposition which allows to write any physically realizable Mueller matrix M in the form $M=M_\Delta M_R M_D$ where $M_D$, $M_R$ and $M_\Delta$ are respectively the Mueller matrices of a diattenuator (D), a retarder (R) and a depolarizer ($\Delta$).

Another important algebraic method is the symmetric decomposition, which describes a Mueller matrix in the form $M=M_{D2}M_{R2}M_\Delta M^t_{R1}M_{D1}$ where $M_{D1}$ and $M_{D2}$ are the Mueller matrices of two diattenuators, $M_{R1}$ and $M_{R2}$ are the Mueller matrices of two retarders, $M_\Delta$ is the Mueller matrix of a depolarizer and $^t$ denotes transposition.

In the following, the case of a symmetric decomposition will be considered, which accounts for the back-and-forth propagation of light backscattered by the tissues of the uterine cervix. In this case, the depolarizer Mueller matrix is expressed as:

$$M_\Delta = \begin{pmatrix} 1 & 0 & 0 & 0 \\ 0 & a & 0 & 0 \\ 0 & 0 & b & 0 \\ 0 & 0 & 0 & c \end{pmatrix}$$

where $0 \leq a \leq 1$, $0 \leq b \leq 1$, $0 \leq c \leq 1$. Coefficients "a" and "b" express the depolarization of linearly polarized light and "c" expresses the depolarization of circularly polarized light. Total depolarization $\Delta$ is defined as:

$$\Delta = 1 - \frac{|a|+|b|+|c|}{3}$$

It takes values between 0 and 1, where 0 means that the sample is not depolarizing and 1 that it is an ideal depolarizer.

FIG. 1 is a very schematic representation of an apparatus according to an embodiment of the invention. The apparatus comprises a modified colposcope CS and a computer CP.

The colposcope CS of the apparatus comprises a light source LS emitting optical radiation OR in the 600-1100 nm spectral range towards a uterine cervix CX through a first (illumination) optical path OP1. Light source LS may for instance be based on light emitting diodes, or on a white-light source such as a halogen or Xenon lamp, fitted with optical filters (alternatively, filters may be provided elsewhere, e.g. in front of the imaging sensor). The spectral width of the illuminating light has been chosen to be 40 nm in the experimental validation of the invention described above, but a larger or narrower bandwidth may be used.

A controlled polarizing state generator PSG is a (well known) optical device, based on polarizer and birefringent plates, which converts non-polarized light into polarized light having a predetermined polarization state, chosen among at least four independent states, which are well-separated on the Poincaré sphere (ideally, a polarization state is represented by a point on the Poincaré sphere, but due to noise it actually correspond to a finite surface thereof). In a preferred embodiment, a numerical optimization algorithm is used to ensure that the polarization states lie on the vertices of a tetrahedron, maximizing the condition number of the W matrix (see the paper by A. Lindberg et al. "Innovative integrated numerical-experimental method for high-performance multispectral Mueller polarimeters based on ferroelectric liquid crystals", Applied Optics 58(19) 5187-5199). In some embodiments, the controlled polarizing state generator PSG can be set to generate any polarization state.

Polarized light FOR from the polarizing state generator PSG impinges on the cervix. Light backscattered from the cervix CX, BSOR, propagates through a second (imaging) optical path OP2, crosses a controlled polarization state analyzer PSA and impinges onto an image sensor (i.e. a CCD camera) IS.

A controlled polarizing state analyzer PSA is a (well known) optical device, based on polarizer and birefringent plates, whose transmittance depends on the polarization state of the impinging light. The controlled polarizing state analyzer PSA must be able to analyze at least four independent polarization states. Like for the PSG, a numerical optimization algorithm is used to ensure that the polarization states lie on the vertices of a tetrahedron, maximizing the condition number of the A matrix (see the paper by A. Lindberg et al. "Innovative integrated numerical-experimental method for high-performance multispectral Mueller polarimeters based on ferroelectric liquid crystals", Applied Optics 58(19) 5187-5199). In some embodiments, the PSA can be set to analyze any polarization state.

Computer CP controls the configurations of the polarizing state generator PSG and of the polarizing state analyzer PSA and processes the images acquired by the image sensor IS to compute at least one depolarization parameter and quantify the progression of pregnancy. The computer should also ensure that no images are acquired while the PSG and/or the PSA are commuting, or that such images are discarded.

More detailed description of modified colposcope suitable for carrying out the invention are provided by US 2018/0271430 and EP 1 738 682 (in the latter case, the device is primarily intended for detecting cancer).

As explained above, a Mueller matrix may be associated to any pixel of an image; therefore, an "individual" depolarization parameter may be computed for each pixel. What is used for quantifying the progression of pregnancy is the average of said individual depolarization parameter over a region of interest defined over the images.

Figure 2C:
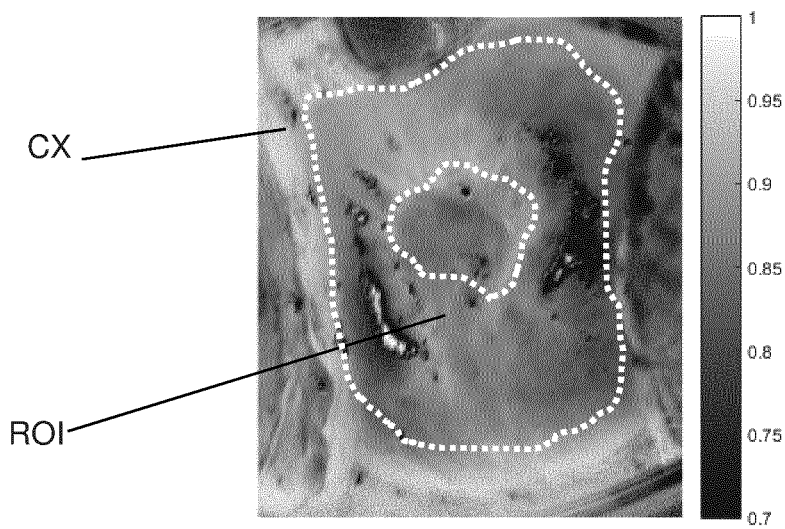

FIG. 2A is a conventional grayscale image of a uterine cervix CX acquired without making use of the polarizing state generator PSG and of the polarizing state analyzer PSA. Reference 1 identifies the cervical os, reference 2 the exocervix. Reference 3 identifies one of several specular reflections of light, which saturates the pixels of the camera. FIG. 2B is an unpolarized ($M_{11}$ coefficient of the Mueller matrix) image at 650 nm of the same uterine cervix. The dotted lines delineate the region of interest ROI, which excludes the cervical os and the outermost part of the image; the operator is however free to choose a different—e.g. smaller— ROI. The boundaries of the region of interest may be drawn manually by a user, e.g. using a pointing device such a computer mouse on a screen on which the image is displayed, or automatically by the computer CP using image processing algorithms such as edge-detecting filters. The regions corresponding to specular reflections are represented in black on the figure and are discarded for the polarimetric analysis. FIG. 2C is a grayscale map of the total depolarization of the cervix, computed through symmetric decomposition of the measured Mueller matrix.

To study the possibility of using polarimetric measurements to quantify the progression of pregnancy the inventors have built a modified colposcope using, as a light source, a halogen lamp with a liquid light guide. The image sensor is able to operate at two wavelengths, 550 nm and 650 nm, in order to study the influence of wavelength on the relevance of the measurements. To this aim, a first longpass dichroic beamsplitter (Thorlabs DMLP605) spatially separates in two orthogonal beams the upper part of the light spectrum above 605 nm from its lower part. These two beams are respectively sent toward two monochromatic CCD cameras "1" and "2" (Allied Prosilica GT1920). Dichroic filters have been set in front on each of these cameras to measure the Mueller matrix images either at 650 nm for the Camera "1" (Thorlabs FB650-40, 40 nm FWHM) or at 550 nm for the Camera "2" (Thorlabs FB550-40, 40 nm FWHM).

The modified colposcope proved suitable for acquiring Mueller polarimetric images of a uterine cervix simultaneously at both wavelengths of 550 nm and 650 nm in approximately 1.6 s. This acquisition time is sufficiently low to considerably reduce blur effects due to movements of the patient.

The modified colposcope was used to explore the uterine cervix in vivo of non-pregnant and pregnant women at different amenorrhea weeks. Measurements presented here involved two groups of patients: the first one comprised 11 non-pregnant women, while the second one comprised 24 pregnant women from 20 to 39 weeks of amenorrhea (35 patients in total). For the second group of women, the cervical length was measured using transvaginal ultrasound technique just after the acquisition of Mueller polarimetric images. Polarimetric measurements on the uterine cervices of non-pregnant women were performed in the Kremlin-Bicêtre University Hospital (Le Kremlin Bicêtre, France) while measurements on pregnant women were performed in the Brugmann University Hospital (Brussels, Belgium). All the patients signed an informed consent form indicating that they understood the nature of their participation in this study.

Mueller matrix images of the 35 cervices were interpreted through symmetric decomposition in order to obtain polarimetric parameters of retardance, diattenuation and depolarization. Different depolarization parameters were extracted either directly from the measured Mueller matrix or from the depolarization matrix issued by decomposition of the latter and their correlation with the number of weeks of amenorrhea (taken to be 0 for non-pregnant patients) was studied. The results obtained for different depolarization parameters measured at 650 nm are illustrated by FIGS. 3 to 20. Results obtained at 550 nm are not illustrated, but will nevertheless be discussed.

All the results discussed below are averages over four successive acquisitions for each pixel, then further spatially averaged over the region of interest.

A first suitable depolarization parameter is total depolarization $\Delta$, defined as:

$$\Delta = 1 - \frac{|a| + |b| + |c|}{3}$$

Figure 3:
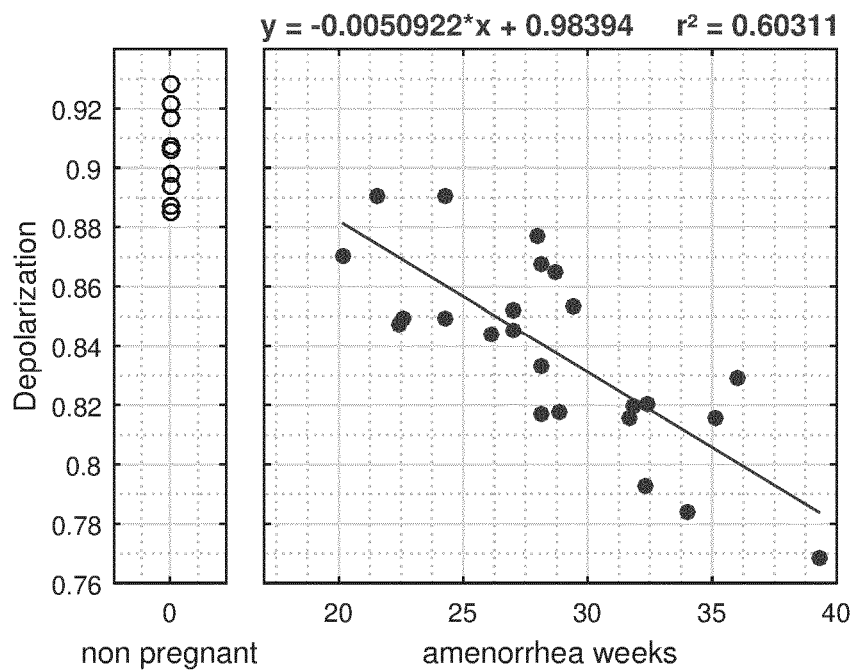

As shown on FIG. 3, total depolarization at 650 nm shows excellent anticorrelation (i.e. negative correlation) with weeks of amenorrhea (coefficient of determination $r^2 \approx 0.6$, which corresponds to linear correlation coefficient $r \approx -0.77$) and ensures a very good separation between pregnant and non-pregnant women. Therefore, $\Delta$ at 650 nm is a very suitable depolarization parameter for carrying out the invention.

Instead, total depolarization at 550 nm is substantially less (anti)correlated with weeks of amenorrhea (coefficient of determination $r^2 \approx 0.34$ which corresponds to linear correlation coefficient $r=-0.58$), and does not ensure a good separation between pregnant and non-pregnant women.

A second suitable depolarization parameter is linear depolarization, expressed by:

$$\text{linear depolarization} = 1 - \frac{|a| + |b|}{2}$$

Figure 4:
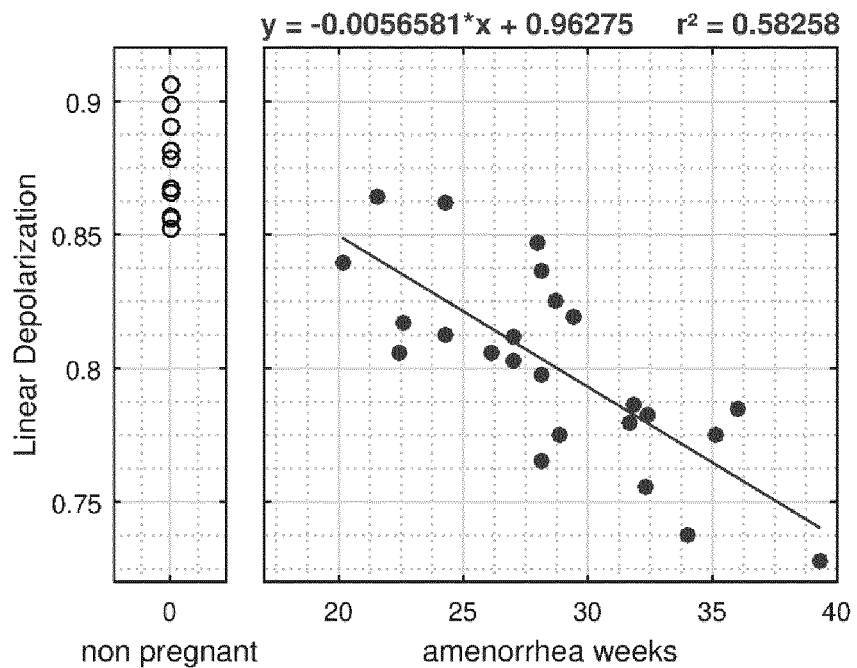

As shown on FIG. 4, linear depolarization at 650 nm shows excellent anticorrelation with weeks of amenorrhea (coefficient of determination $r^2 \approx 0.58$, which corresponds to linear correlation coefficient $r=-0.76$) and ensures a very good separation between pregnant and non-pregnant women. Therefore, linear depolarization at 650 nm is a very suitable depolarization parameter for carrying out the invention.

Instead, linear depolarization at 550 nm is substantially less anticorrelated with weeks of amenorrhea (coefficient of determination $r^2 \approx 0.33$, which corresponds to linear correlation coefficient $r \approx -0.57$), and does not ensure a good separation between pregnant and non-pregnant women.

A third suitable depolarization parameter is circular depolarization, expressed by:

$$\text{circular depolarization} = 1 - |c|.$$

Figure 5:
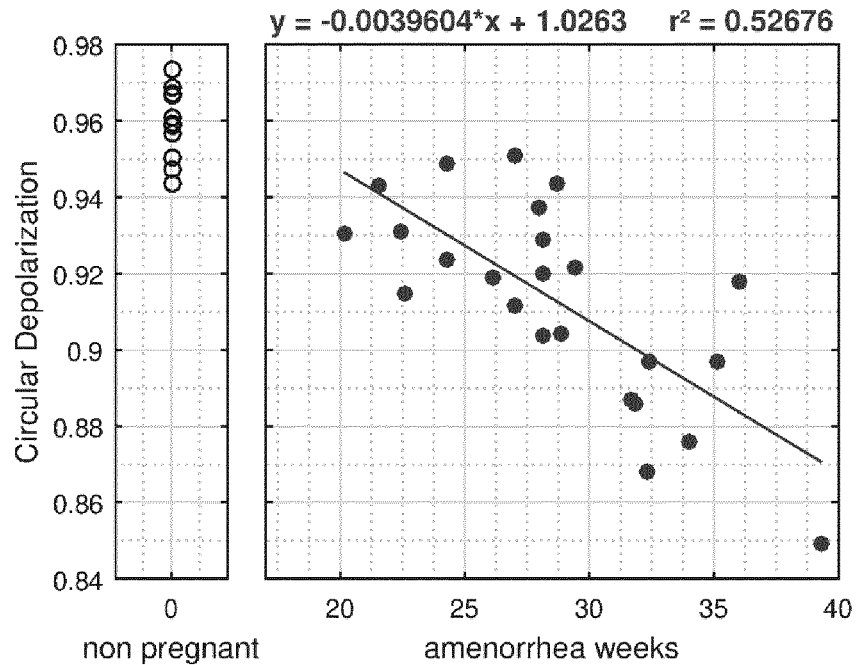

As shown on FIG. 5, circular depolarization at 650 nm is very well anticorrelated with weeks of amenorrhea (coefficient of determination $r^2 \approx 0.53$, which corresponds to linear correlation coefficient $r \approx -0.72$) and ensures a very good separation between pregnant and non-pregnant women. Therefore, $\Delta$ at 650 nm is a suitable depolarization parameter for carrying out the invention.

Instead, circular depolarization at 550 nm is substantially less (anti)correlated with weeks of amenorrhea (coefficient of determination $r^2 \approx 0.36$, which corresponds to linear correlation coefficient $r \approx -0.6$), and does not ensure a good separation between pregnant and non-pregnant women.

A fourth suitable depolarization parameter is depolarization index $P_\Delta$ expressed by:

$$P_\Delta = \sqrt{\frac{tr(M^t M) - M_{11}^2}{3 M_{11}^2}}$$

where $M_{11}$ is the (1,1) coefficient of the Mueller matrix and $tr(\bullet)$ is the trace operator.

Figure 6:
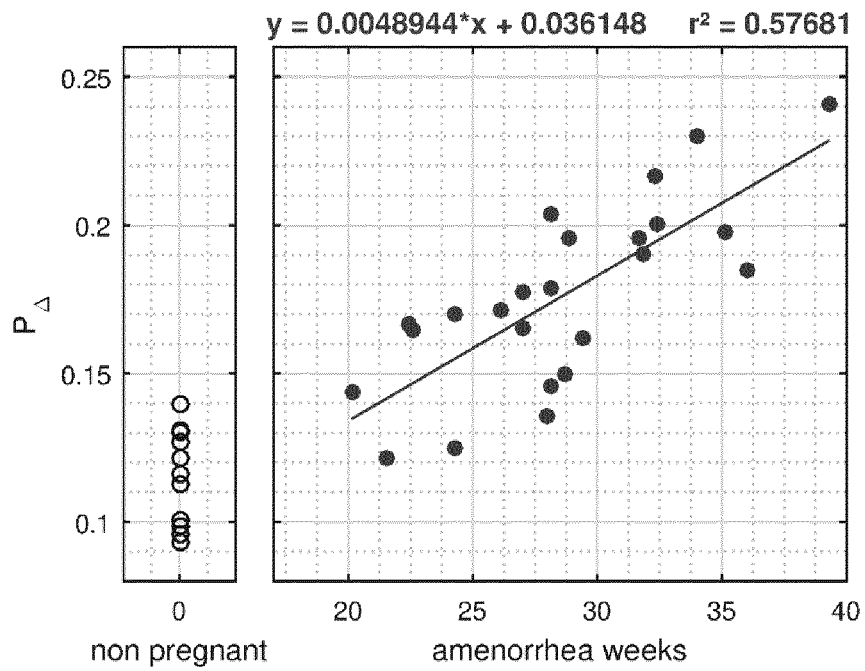

As shown on FIG. 6, depolarization index at 650 nm shows excellent (positive) correlation with weeks of amenorrhea (coefficient of determination $r^2 \approx 0.58$) and ensures a quite good separation between pregnant and non-pregnant women.

Therefore, the depolarization index at 650 nm is a very suitable depolarization parameter for carrying out the invention.

Instead, depolarization index at 550 nm is substantially less correlated with weeks of amenorrhea (coefficient of determination $r^2 \approx 0.34$, which corresponds to linear correlation coefficient r≈0.58), and does not ensure a good separation between pregnant and non-pregnant women.

A fifth suitable depolarization parameter is (polarimetric) entropy, designated by S and expressed by:

$$S = -\sum_{i=1}^{4} \lambda_i \log_4 \lambda_i$$

where $\lambda_I$ are the eigenvalues of the coherence matrix C, given by:

$$C = \sum_{i,j=1}^{4} M_{ij}(\sigma_i \otimes \sigma_j^*)$$

$\sigma_i$ being the Pauli matrices.

Figure 7:
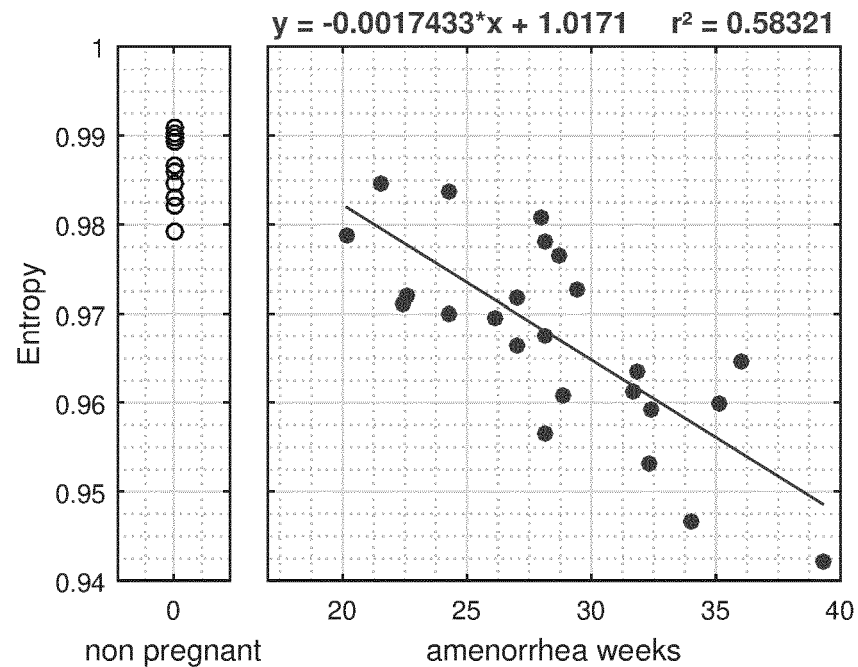

As shown on FIG. 7, entropy at 650 nm shows excellent anticorrelation with weeks of amenorrhea (coefficient of determination $r^2$≈0.58, which corresponds to linear correlation coefficient r≈−0.76) and ensures a quite good separation between pregnant and non-pregnant women.

Therefore, entropy at 650 nm is a very suitable depolarization parameter for carrying out the invention.

Instead, entropy at 550 nm is substantially less correlated with weeks of amenorrhea (coefficient of determination $r^2$≈0.33, which corresponds to linear correlation coefficient r≈0.57), and does not ensure a good separation between pregnant and non-pregnant women.

Sixth, seventh, eighth and ninth depolarization parameters are the three purity indices $IPP_1$, $IPP_2$, $IPP_3$ and the overall purity index PI, expressed by:

$$IPP_1 = \frac{\lambda_1 - \lambda_2}{tr(S)} \quad IPP_2 = \frac{\lambda_1 + \lambda_2 - 2\lambda_3}{tr(s)} \quad IPP_3 = \frac{\lambda_1 + \lambda_2 + \lambda_3 - 3\lambda_4}{tr(S)}$$

$$PI = \sqrt{\frac{IPP_1^2 + IPP_2^2 + IPP_3^2}{3}}$$

Figure 8:
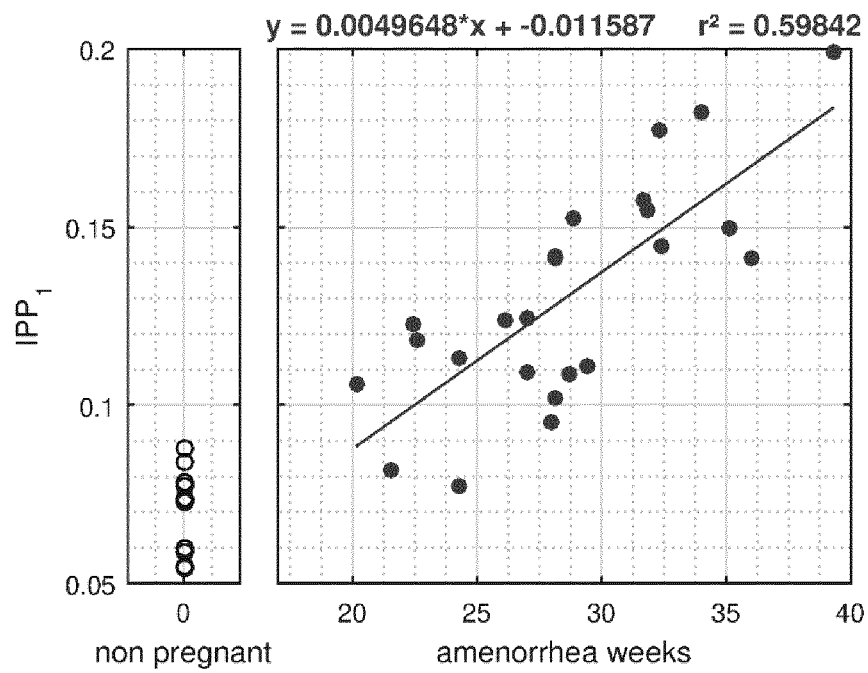

As shown on FIG. 8, purity index $IPP_1$ at 650 nm shows excellent anticorrelation with weeks of amenorrhea (coefficient of determination $r^2$≈0.60, which corresponds to r≈−0.77) and ensures a very good separation between pregnant and non-pregnant women. Therefore, $IPP_1$ at 650 nm is a very suitable depolarization parameter for carrying out the invention.

Instead, purity index $IPP_1$ at 550 nm is substantially less correlated with weeks of amenorrhea (coefficient of determination $r^2$≈0.36, corresponding to linear correlation coefficient r≈0.6), and does not ensure a good separation between pregnant and non-pregnant women.

Figure 9:
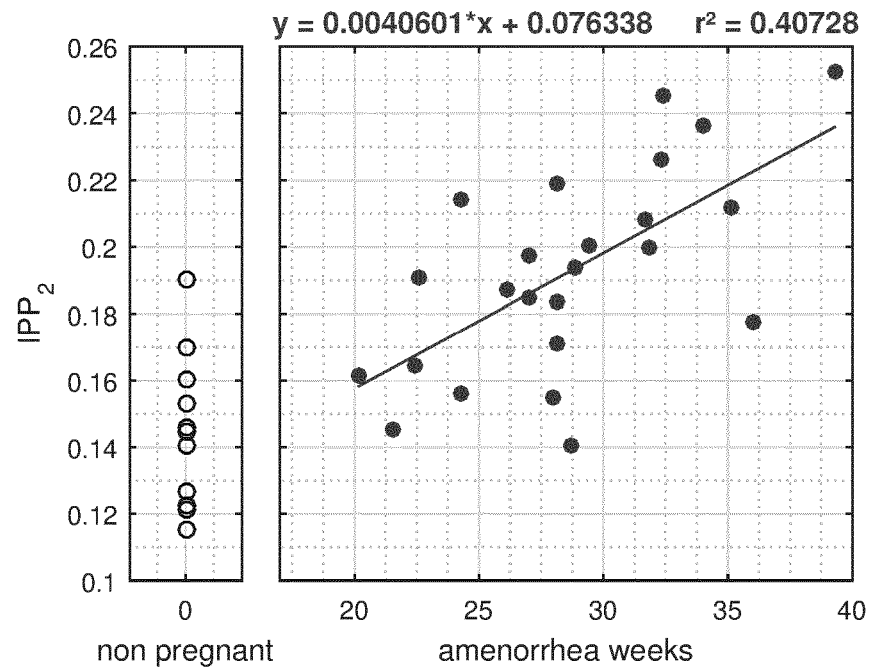

As shown on FIG. 9, purity index $IPP_2$ at 650 nm is well correlated with weeks of amenorrhea (coefficient of determination $r^2$≈0.41, which corresponds to r≈0.64), but does not ensure a very good separation between pregnant and non-pregnant women.

Therefore, $IPP_2$ at 650 nm is also a suitable depolarization parameter for carrying out the invention.

Purity index $IPP_2$ at 550 nm is substantially less correlated with weeks of amenorrhea (coefficient of determination $r^2$≈0.30, which corresponds to linear correlation coefficient r≈0.55), and does not ensure a good separation between pregnant and non-pregnant women.

Figure 10:
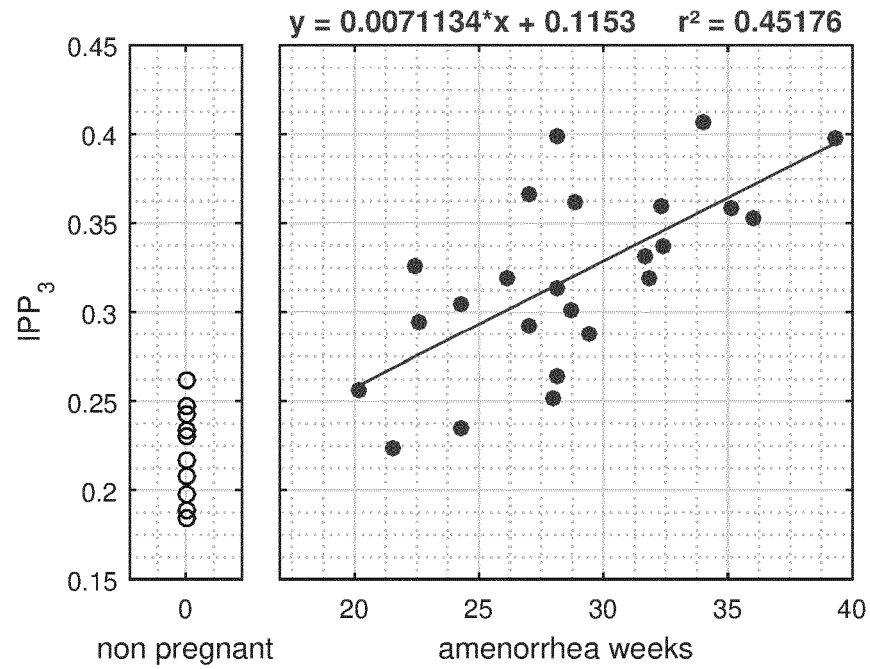

As shown on FIG. 10, purity index $IPP_3$ at 650 nm is well correlated with weeks of amenorrhea (coefficient of determination $r^2$≈0.45, which corresponds to linear correlation coefficient r≈0.67), but does not ensure a very good separation between pregnant and non-pregnant women.

Therefore, $IPP_3$ at 650 nm is also a suitable depolarization parameter for carrying out the invention.

Purity index $IPP_3$ at 550 nm is quite poorly correlated with weeks of amenorrhea (coefficient of determination $r^2$≈0.26, which corresponds to linear correlation coefficient r≈0.51) and does not ensure a good separation between pregnant and non-pregnant women.

Figure 11:
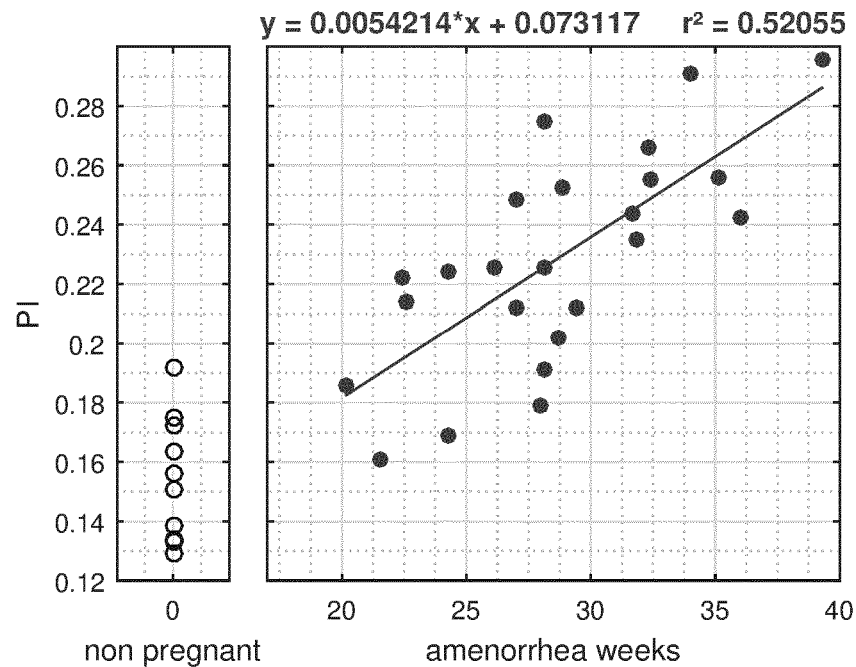

As shown on FIG. 11, the overall purity index PI at 650 nm is very well correlated with weeks of amenorrhea (coefficient of determination $r^2$≈0.52, which corresponds to linear correlation coefficient r≈0.72), but does not ensure a very good separation between pregnant and non-pregnant women.

Separation between pregnant and non-pregnant women is an advantageous, but not essential feature. Therefore, PI at 650 nm is also a suitable depolarization parameter for carrying out the invention.

Overall purity index PI at 550 nm is well correlated with weeks of amenorrhea (coefficient of determination $r^2$≈0.31, which corresponds to linear correlation coefficient r≈0.56), but does not ensure a good separation between pregnant and non-pregnant women.

A tenth suitable depolarization parameter is $\lambda_1$ (the largest eigenvalue of the coherence matrix). $\lambda_1$ can also be expressed using the purity indices by $$\lambda_1 = \frac{tr(S)}{4}\left(1 + 2P_1 + \frac{2}{3}P_2 + \frac{1}{3}P_3\right)$$

Figure 12:
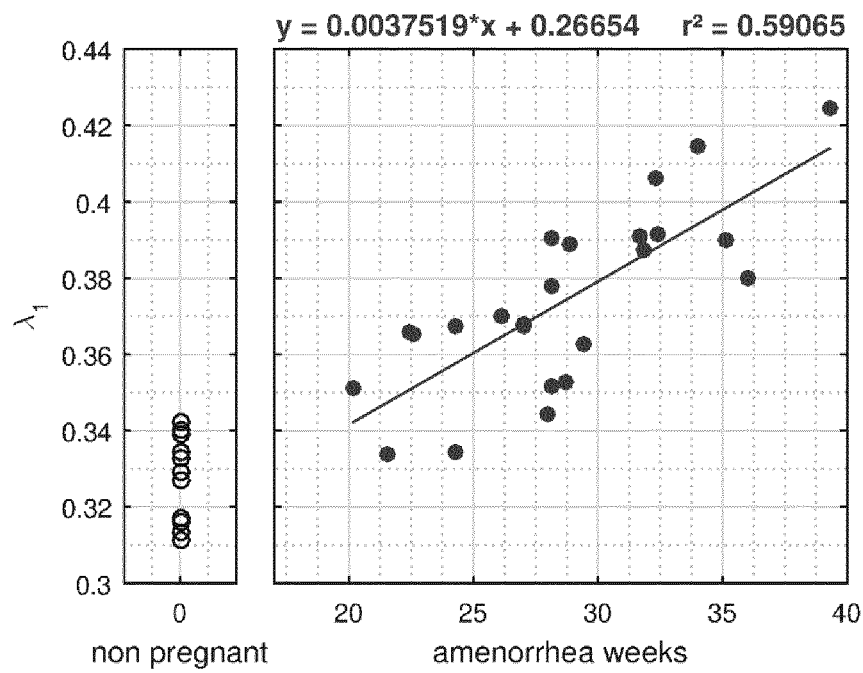

As shown on FIG. 12, $\lambda_1$ at 650 nm shows excellent correlation with weeks of amenorrhea (coefficient of determination $r^2$≈0.59, which corresponds to linear correlation coefficient r≈0.77) and ensures a very good separation between pregnant and non-pregnant women.

Therefore, $\lambda_1$ at 650 nm is a very suitable depolarization parameter for carrying out the invention.

Instead, $\lambda_1$ at 550 nm is substantially less correlated with weeks of amenorrhea (coefficient of determination $r^2$≈0.34, which corresponds to linear correlation coefficient r≈0.58), and does not ensure a good separation between pregnant and non-pregnant women.

Figure 13:
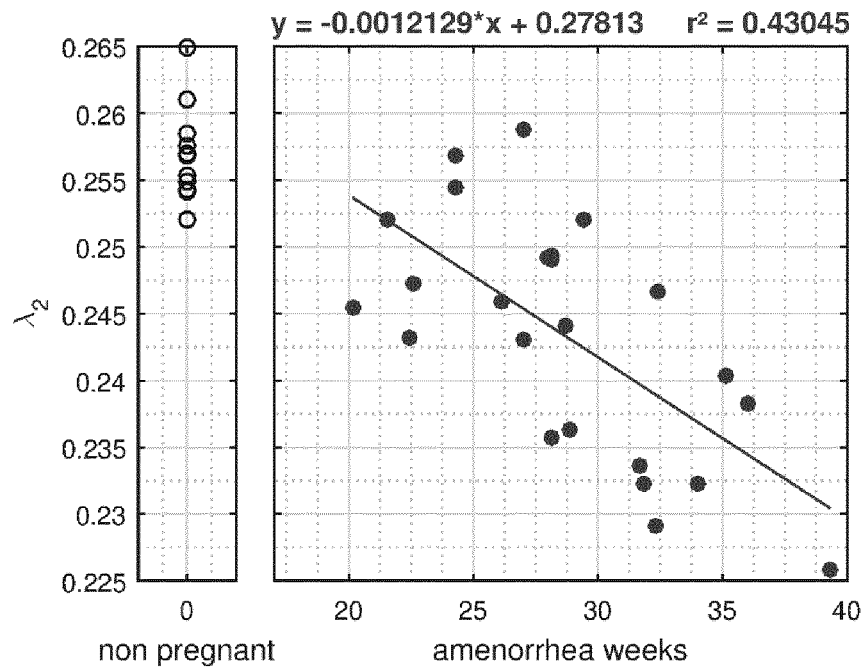

As shown on FIG. 13, $\lambda_2$ is well anticorrelated with weeks of amenorrhea (coefficient of determination $r^2$≈0.43, which corresponds to a linear correlation coefficient r≈0.65), but doesn't ensure a good separation between pregnant and non-pregnant women.

Therefore, $\lambda_2$ at 650 nm is also a suitable depolarization parameter for carrying out the invention.

Instead, $\lambda_2$ at 550 nm is well anticorrelated with weeks of amenorrhea (coefficient of determination $r^2$≈0.36, which corresponds to linear correlation coefficient r≈0.6), but doesn't ensure a good separation between pregnant and non-pregnant women.

Figure 14:
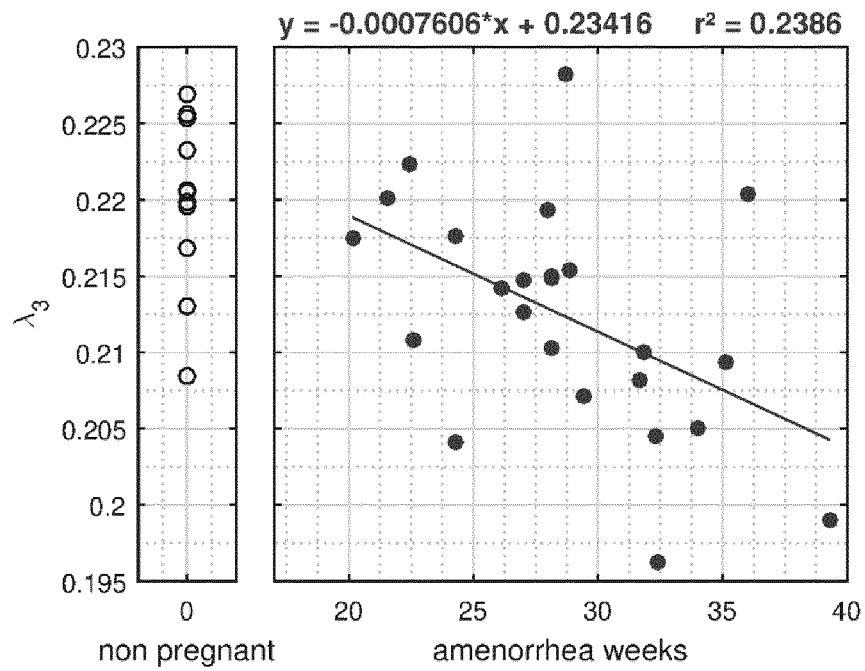

As shown on FIG. 14, $\lambda_3$ at 650 nm is weakly anticorrelated with weeks of amenorrhea (coefficient of determination $r^2$≈0.24, which corresponds to linear correlation coefficient r≈0.49) and doesn't ensure a good separation between pregnant and non-pregnant women.

$\lambda_3$ at 550 nm is also weakly anticorrelated with weeks of amenorrhea (coefficient of determination $r^2$≈0.31, which corresponds to linear correlation coefficient r≈0.56), and doesn't ensure a good separation between pregnant and non-pregnant women.

Figure 15:
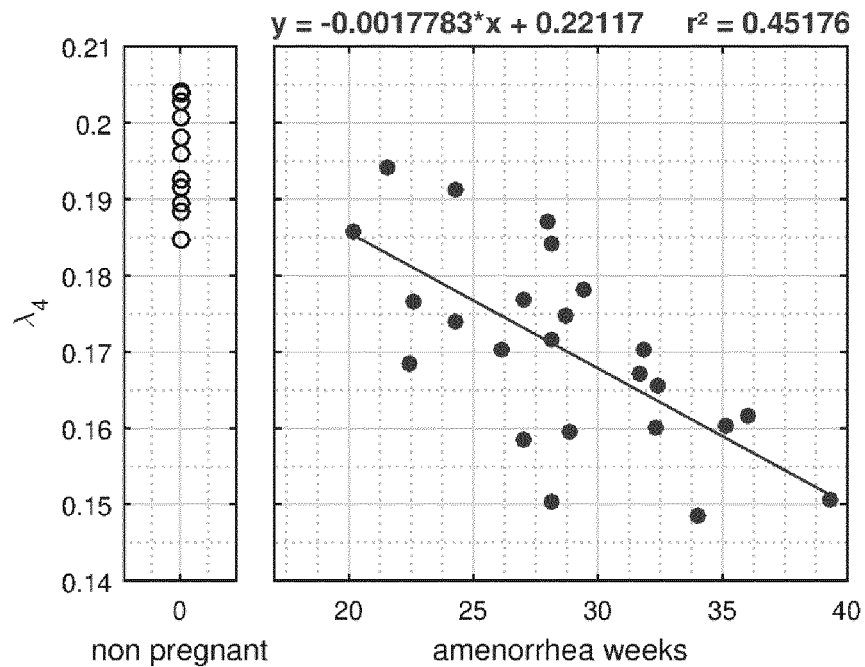

As shown on FIG. 15, $\lambda_4$ at 650 nm is well anticorrelated with weeks of amenorrhea (coefficient of determination $r^2$≈0.45, which corresponds to linear correlation coefficient r≈0.67), but doesn't ensure a good separation between pregnant and non-pregnant women.

Therefore, $\lambda_4$ at 650 nm is also a suitable depolarization parameter for carrying out the invention.

Instead, $\lambda_4$ at 550 nm is moderately anticorrelated with weeks of amenorrhea (coefficient of determination $r^2$≈0.26, which corresponds to linear correlation coefficient r≈0.50) and doesn't ensure a good separation between pregnant and non-pregnant women.

The second, third and fourth eigenvalues of the coherence matrix can be expressed as functions of the purity indices are as follows:

$$\lambda_2 = \frac{tr(S)}{4}\left(1 - 2P_1 + \frac{2}{3}P_2 + \frac{1}{3}P_3\right)$$

$$\lambda_3 = \frac{tr(S)}{4}\left(1 - \frac{4}{3}P_2 + \frac{1}{3}P_3\right)$$

$$\lambda_4 = \frac{tr(S)}{4}(1 - P_3)$$

Linear combinations of the eigenvalues of the coherency matrix may also be used, e.g. $\lambda_2 - \lambda_1$, but they do not seem to perform better than $\lambda_1$ alone.

Until now, only depolarization parameters issued by a Muller matrix have been considered. However depolarization parameter may also be directly computed from the Stokes vector $S=(S_0, S_1, S_2, S_3)$ of the backscattered light. For the present study, Stokes vectors have been computed from the Mueller matrix, but in different embodiments they may be directly measured using a simplified setup.

Degree of polarization DoP is expressed by:

$$DoP = \sqrt{\frac{S_1^2 + S_2^2 + S_3^2}{S_0^2}}$$

Figure 16:
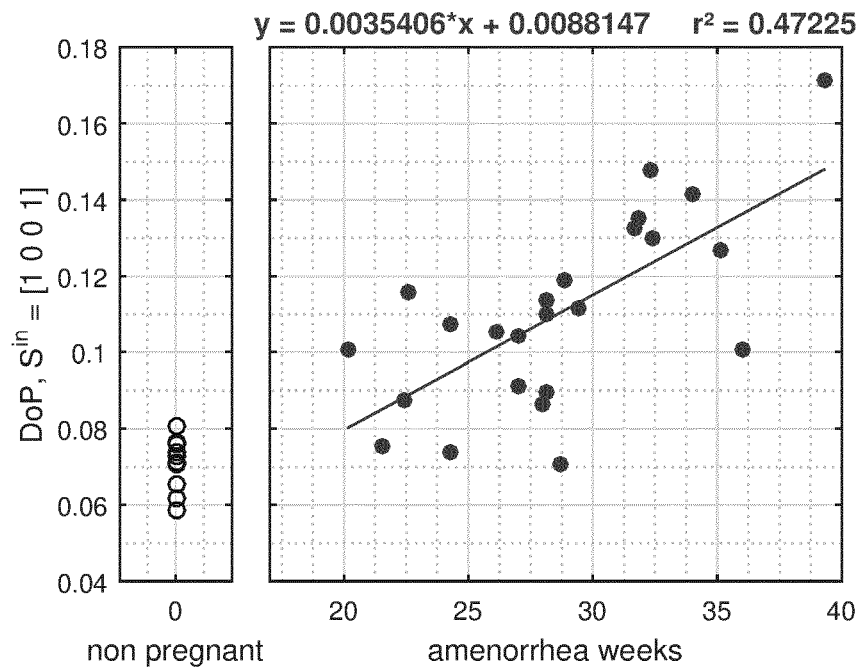

FIG. 16 shows that DoP measured when the uterine cervix is illuminated with right circularly polarized light—Stokes vector $(1\ 0\ 0\ 1)^T$—at 650 nm is well correlated with weeks of amenorrhea (coefficient of determination $r^2$≈0.47, which corresponds to linear correlation coefficient r≈0.69) and ensures a quite good separation between pregnant and non-pregnant women.

Therefore, DoP at 650 nm with right circularly polarized light is a suitable depolarization parameter for carrying out the invention.

Instead, the DoP for right circularly polarized light at 550 nm is substantially less correlated with the weeks of amenorrhea (coefficient of determination $r^2$≈0.31, which corresponds to linear correlation coefficient r≈0.56), and doesn't ensures a good separation between pregnant and non-pregnant women.

Results obtained with left circularly polarized light are identical, both for 650 and 550 nm.

Therefore, DoP at 650 nm with left circularly polarized light is also a suitable depolarization parameter for carrying out the invention.

Figure 17:
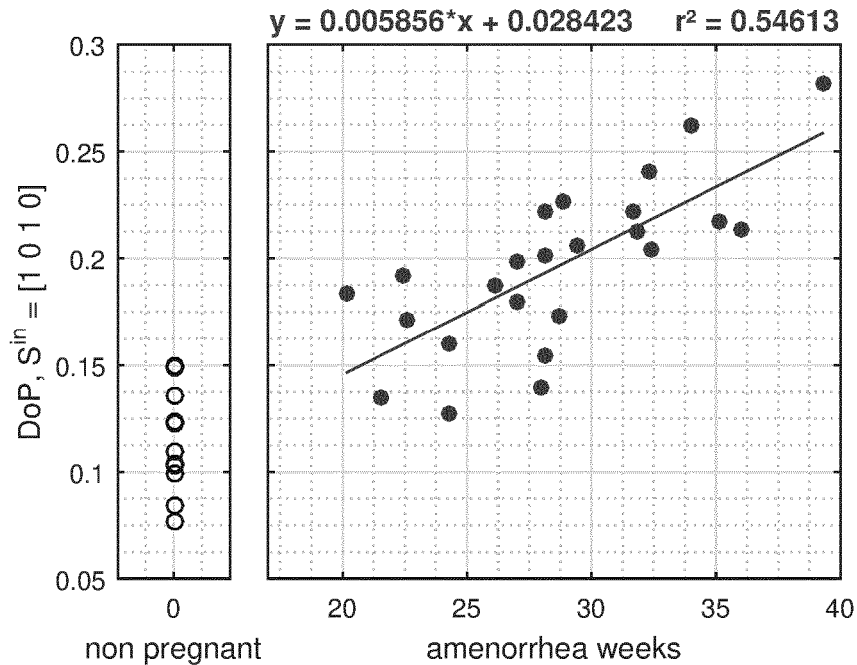

FIG. 17 shows that DoP measured when the uterine cervix is illuminated with linearly polarized light with 45° orientation—Stokes vector $(1\ 0\ 1\ 0)^T$—at 650 nm is very well correlated with weeks of amenorrhea (coefficient of determination $r^2$≈0.55, which corresponds to linear correlation coefficient r≈0.74) and ensures a very good separation between pregnant and non-pregnant women.

Therefore, DoP at 650 nm with linearly polarized light at 45° is also a suitable depolarization parameter for carrying out the invention.

Instead, the DoP for linearly polarized light with 45° orientation at 550 nm is substantially less correlated with the weeks of amenorrhea (coefficient of determination $r^2$≈0.32, which corresponds to linear correlation coefficient r≈0.57), but doesn't ensure a good separation between pregnant and non-pregnant women.

Figure 18:
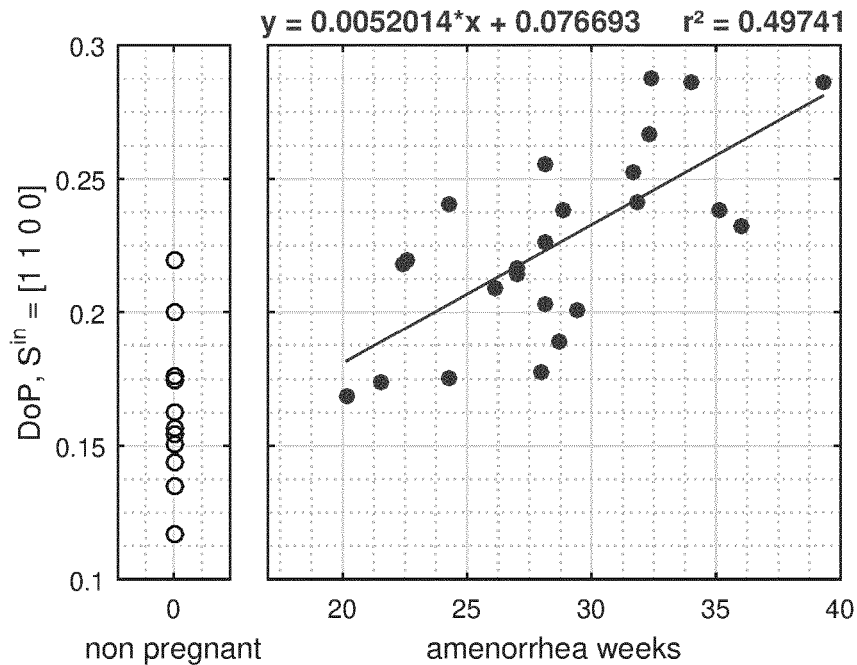

FIG. 18 shows that DoP measured when the uterine cervix is illuminated with linearly polarized light with 0° orientation—Stokes vector $(1\ 1\ 0\ 0)^T$—at 650 nm is very well correlated with weeks of amenorrhea (coefficient of determination $r^2$≈0.50, which corresponds to linear correlation coefficient r≈0.71), but it doesn't ensure a good separation between pregnant and non-pregnant women.

Therefore, DoP at 650 nm with linearly polarized light at 0° is a very suitable depolarization parameter for carrying out the invention.

Instead, the DoP for linearly polarized light with 0° orientation at 550 nm is substantially less correlated with the weeks of amenorrhea (coefficient of determination $r^2$≈0.31, which corresponds to linear correlation coefficient r≈0.56), and doesn't ensure a good separation between pregnant and non-pregnant women.

The orientation for DoP is defined with respect to a front-back axis of the patient.

Orthogonal state contrast (OSC) is measured by illuminating the cervix with linearly polarized light and detecting diffused light through a linear polarization analyzer whose polarization direction can be turned with respect to that of the incoming light. It is defined as:

$$OSC = \frac{I_\| - I_\perp}{I_\| + I_\perp}$$

where $I_\|$ (respectively, $I_\perp$) is the intensity measured when the polarization direction of the analyzer is parallel (respectively, perpendicular) to that of the incoming light.

Figure 19:
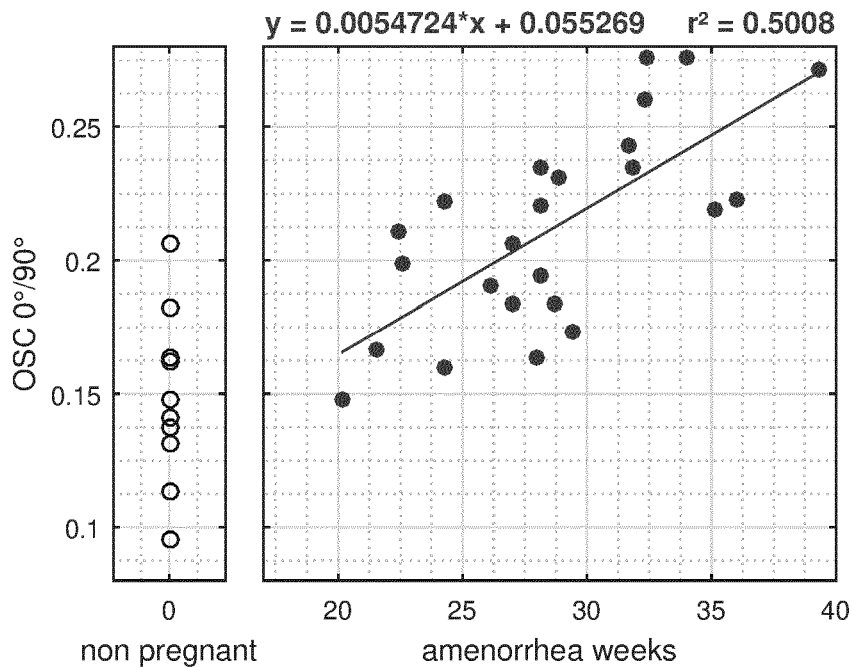

FIG. 19 shows that 0°/90° OSC (i.e. OSC measured when the polarization direction of the incoming light is aligned with a front-back axis of the patient) at 650 nm is well correlated with weeks of amenorrhea (coefficient of determination $r^2$≈0.50, which corresponds to r≈0.71), but it does not ensure a good separation between pregnant and non-pregnant women.

Therefore, 0°/90° OSC at 650 nm is also a suitable depolarization parameter for carrying out the invention.

Instead, 0°/90° OSC at 550 nm is substantially less correlated with the weeks of amenorrhea (coefficient of determination $r^2$≈0.32, which corresponds to linear correlation coefficient r≈0.57), and doesn't ensure a good separation between pregnant and non-pregnant women.

Figure 20:
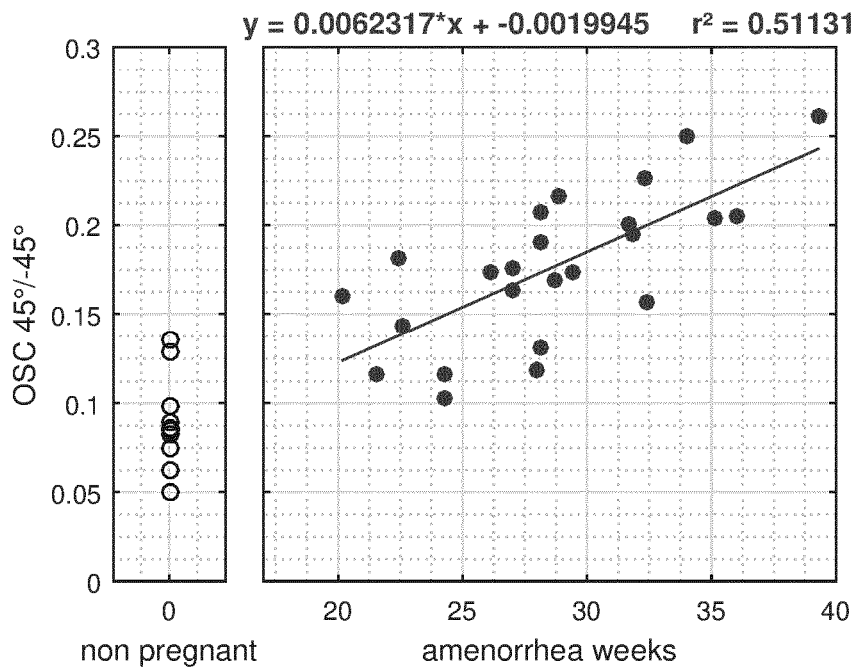

FIG. 20 shows that +45°/−45° OSC (i.e. OSC measured when the polarization direction of the incoming light forms an angle of 45° with a front-back axis of the patient) at 650 nm is very well correlated with weeks of amenorrhea (coefficient of determination $r^2$≈0.51, which corresponds to r≈0.71), but doesn't ensure a good separation between pregnant and non-pregnant women.

Therefore, +45°/−45° OSC at 650 nm is a very suitable depolarization parameter for carrying out the invention.

Instead, +45°/−45° OSC at 550 nm is substantially less correlated with the weeks of amenorrhea (coefficient of determination $r^2 \approx 0.31$, which corresponds to r≈0.56), and it does not ensure a good separation between pregnant and non-pregnant women.

DoP and OSC value have also be measured using 32 different polarization states sampling the Poincaré sphere, at both 650 nm and 550 nm.

Figure 21A:
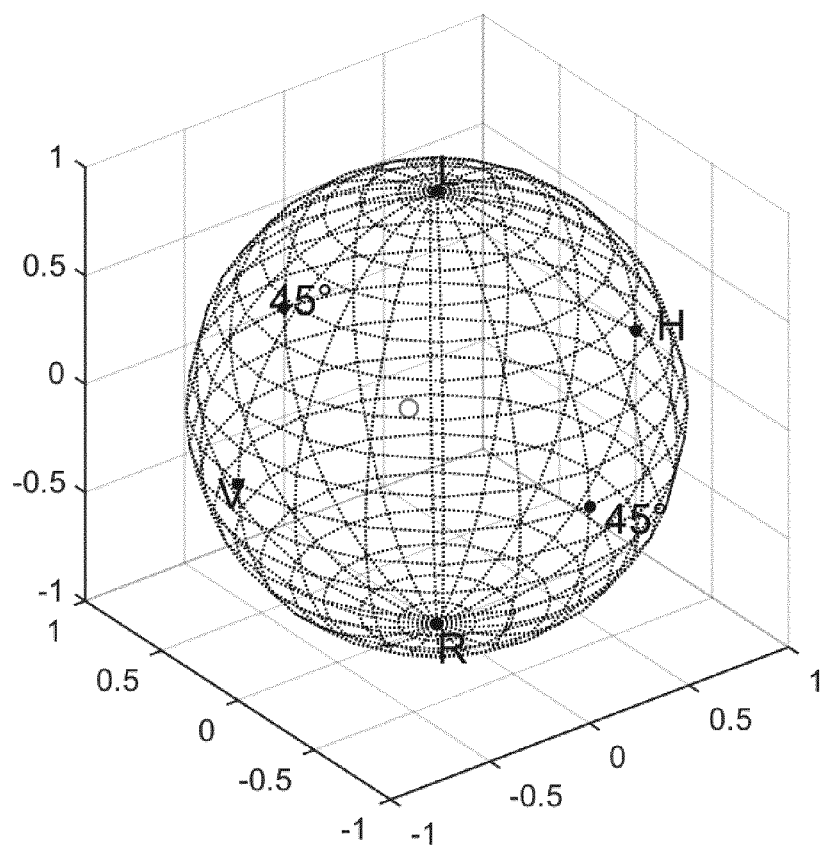
Figure 21B:
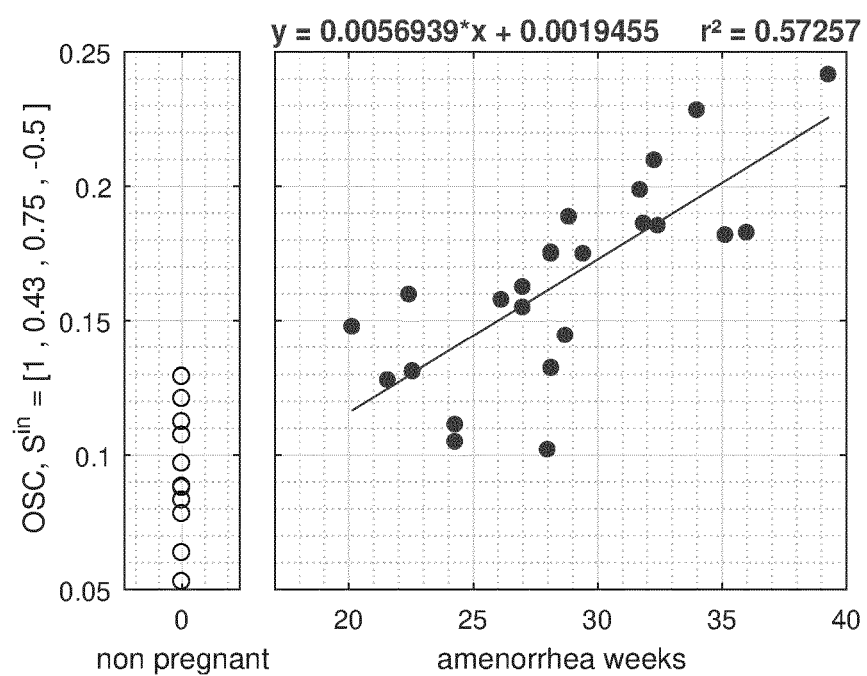

The best results for OSC at 650 nm were obtained using a polarization state defined by Stokes vector $S^{in}=(1.00; 0.43; 0.75; -0.50)^T$. FIG. 21A shows the position of this state as a circle on the Poincaré sphere, and FIG. 21B the experimental results. The OSC obtained at 650 nm for this Stokes vector is very well correlated with amenorrhea weeks (coefficient of determination $r^2 \approx 0.57$ which corresponds to r≈0.75), but it doesn't ensure a good separation between pregnant and non-pregnant women.

The worst result for OSC at 650 nm, obtained for $S^{in}=(1.00; 0.50; -0.87; 0.00)^T$, is nevertheless acceptable as it corresponds to $r^2 \approx 0.38$.

Figure 22A:
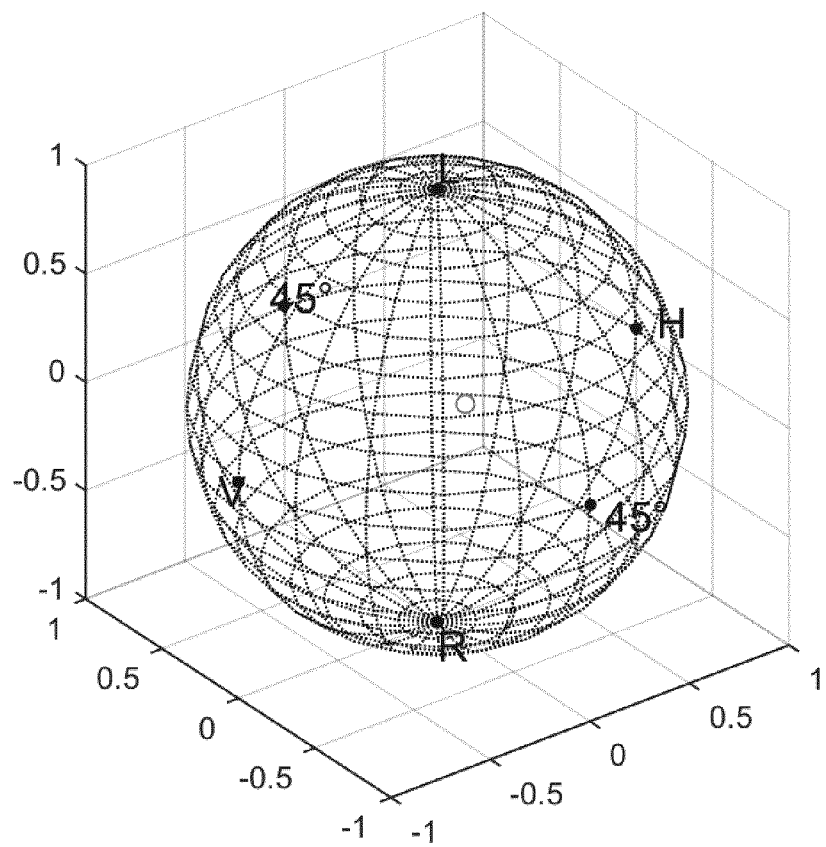
Figure 22B:
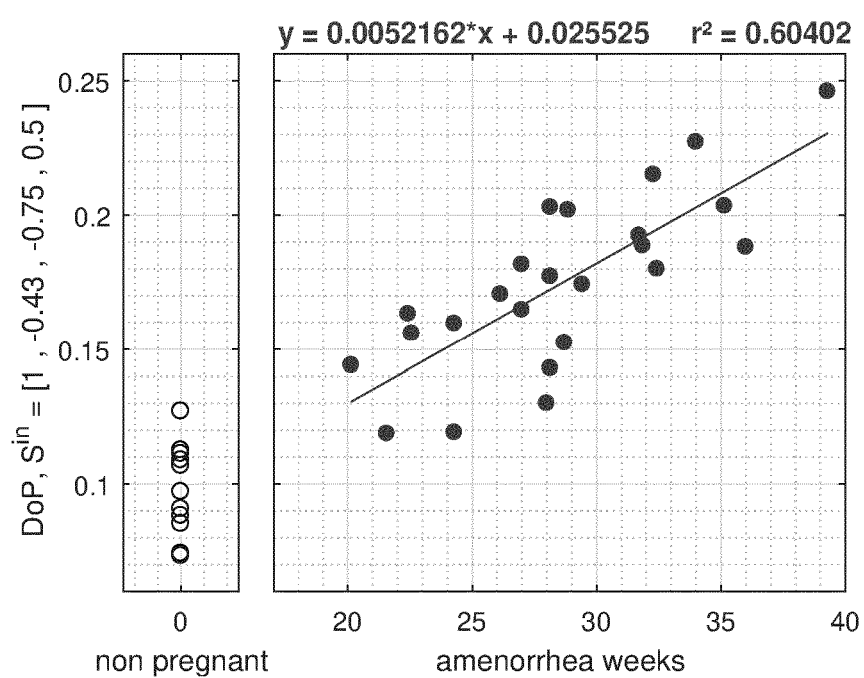

Even better results were obtained for DoP with a polarization state defined by Stokes vector $S^{in}=(1.00; -0.43; -0.75; 0.50)^T$ at 650 nm. FIG. 22A shows the position of this state as a circle on the Poincaré sphere, and FIG. 22B the experimental results. The DoP obtained for this Stokes vector is very well correlated with the weeks of amenorrhea (coefficient of determination $r^2 \approx 0.6$ which corresponds to linear correlation coefficient r≈0.77) and it ensures a very good separation between pregnant and non-pregnant women.

The worst result for DoP at 650 nm, obtained for $S^{in}=(1.00; 0.43; -0.75; -0.50)^T$, is nevertheless acceptable as it corresponds to $r^2 \approx 0.41$.

At 550 nm, the correlation is substantially poorer for both OSC and DoP. The best results for DoP correspond to $S^{in}=(1.00; -0.87; 0.00; -0.50)$ and $r^2 \approx 0.36$. The best results for OSC also correspond to $S^{in}=(1.00; -0.87; 0.00; -0.50)$ and $r^2 \approx 0.37$. It can be seen that the best results at 550 nm are indeed less good than the worst ones at 650 nm.

Figure 23:
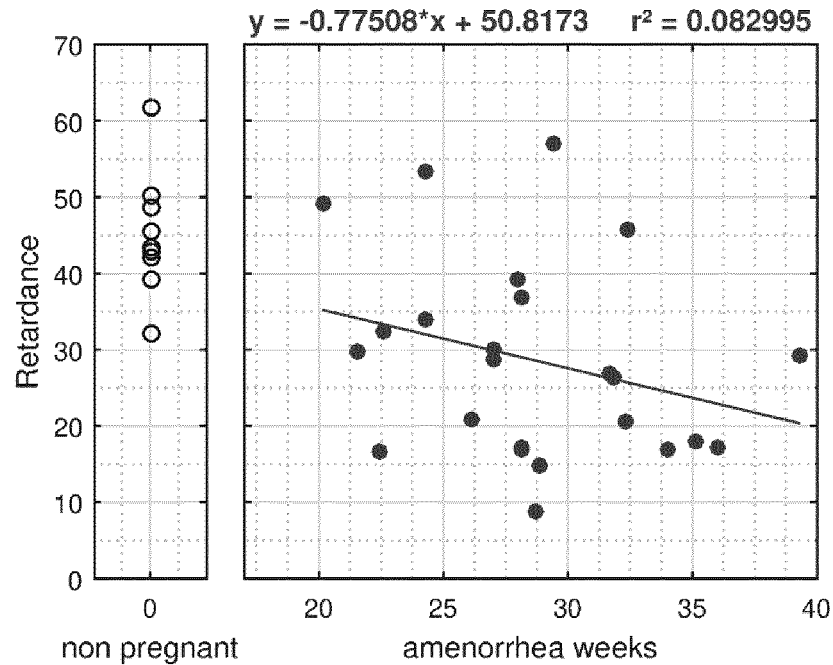

Contrarily to depolarization parameters, parameters related to retardance bring no information on the progression of a pregnancy. For instance, FIG. 23 shows that total retardance R at 650 nm $$R = \arccos\left[\frac{tr(M_R)}{2} - 1\right]$$

with $M_R = M_{R2}M_{R1}'$ (i.e. the product of the two retardance matrices yield by symmetric decomposition) is poorly correlated with the weeks of amenorrhea (coefficient of determination $r^2 \approx 0.08$, which corresponds to linear correlation coefficient r≈0.28) and doesn't allow any separation between pregnant and non-pregnant women. Retardance at 550 nm is no more useful for estimating the progression of pregnancy (coefficient of determination $r^2 \approx 0.09$, which corresponds to linear correlation coefficient r≈0.3).

Figure 24:
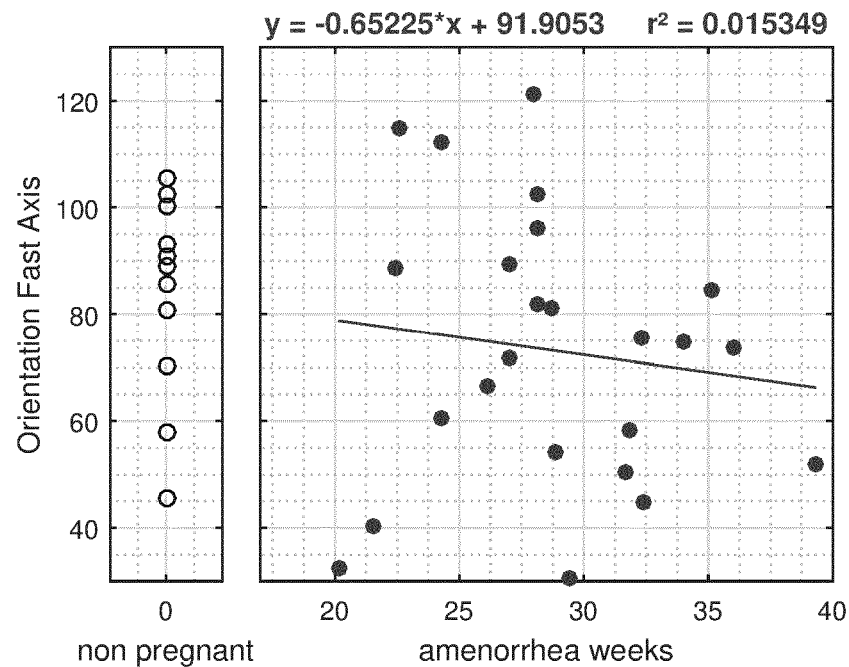

FIG. 24 shows that azimuth, expressed by arctan $$\left(\frac{M_R(2, 4)}{M_R(4, 3)}\right)$$

is even less correlated with the weeks of amenorrhea at 650 nm (coefficient of determination $r^2 \approx 0.015$, which corresponds to linear correlation coefficient r≈0.12) and doesn't allow any separation between pregnant and non-pregnant women. Azimuth at 550 nm is no more useful for estimating the progression of pregnancy (coefficient of determination $r^2 \approx 0.02$, which corresponds to linear correlation coefficient r≈0.14).

FIGS. 25 and 26 shows that the "incoming" (associated to matrix $M_{D1}$ of the symmetric decomposition of the Mueller matrix) and "outcoming" (associated to $M_{D2}$ of the symmetric decomposition of the Mueller matrix) diattenuation values at 650 nm are also almost uncorrelated with the weeks of amenorrhea (coefficient of determination of $r^2 \approx 0.0073$ for "incoming" diattenuation, which corresponds to linear correlation coefficient r≈0.09 and coefficient of determination $r^2 \approx 0.0026$ for "outcoming" diattenuation, which corresponds to linear correlation coefficient r≈0.05). The diattenuation value D is extracted from the Mueller matrix of the diattenuator as $D=\sqrt{M_D(1,2)^2 + M_D(1,3)^2 + M_D(1,4)^2}$.

Finally, FIG. 27 shows that the length of the uterine cervix, measured using transvaginal ultrasounds, is also substantially uncorrelated with amenorrhea weeks (coefficient of determination $r^2=0.0039$, which corresponds to linear correlation coefficient r≈0.06).

The results above show that depolarization induced by tissues of the uterine cervix—unlike other polarimetric properties—carries useful information on the progression of a pregnancy. They also show that comparatively long wavelengths (while remaining in the transparency window for animal tissues) yield better result than shorter ones.

The depolarization parameters, measured at 650 nm, which are better correlated to the progression of pregnancy turn out to be:

Linear depolarization: $r^2 \approx 0.58$
Circular depolarization: $r^2 \approx 0.53$
$P_A$: $r^2 \approx 0.58$
S: $r^2 \approx 0.58$
$IPP_1$: $r^2 \approx 0.60$
$\lambda_1$: $r^2 \approx 0.59$
DoP for $S^{in}=(1\ 0\ 1\ 0)^T$—i.e. linear polarization with 45° orientation: $r^2 \approx 0.55$
DoP for $S^{in}=(1\ 1\ 0\ 0)^T$—i.e. linear polarization with 0° orientation: $r^2 \approx 0.50$
0°/90° OSC: $r^2 \approx 0.50$
+45°/−45° OSC: $r^2 \approx 0.51$
OSC with $S^{in}=(1.00; 0.43; 0.75; -0.50)^T$: $r^2 \approx 0.57$
DoP with $S^{in}=(1.00; -0.43; -0.75; 0.50)^T$: $r^2 \approx 0.6$ A standard curve, linking a depolarization parameter to the number of weeks of amenorrhea, may be learned. The measurement results for a particular patient, for which the actual number of weeks of amenorrhea is known by other means, may be compared with this standard curve. If a measurement result corresponds to an expected number of weeks of amenorrhea larger than the actual one, it can be deduced that there is a risk of premature birth.

The invention has been described with reference to particular embodiments but it is not limited to them.

For instance, a number of depolarization metrics have been considered all based on the Stokes formalism. However, different parameters may be used, possibly based on different formalisms, provided that they express depolarization induced by cervix tissues.

A minimum of 16 measurements are required to fully determine a Mueller matrix, and 4 measurements are required for determining a Stokes vector. However, a greater number of measurements may be used, in which case quadratic minimization is generally used to estimate Mueller/Stokes parameters.

If Mueller matrices are used, they need not necessarily undergo symmetric decomposition; other decomposition techniques (e.g. the Lu-Chipman, Reverse, Cloude, Logarithmic . . . ) may be used instead. Moreover, some of the depolarization metrics discussed above (depolarization index, entropy, purity indices and eigenvalues of the coherence matrix) do not require any decomposition.

In the simplest embodiments of the invention, a single depolarization parameter is extracted from measurement performed using light of a same wavelength, or a same wavelength range. However, in more complex embodiments, an index of the pregnancy progression may be computed as a function of several depolarization parameters, possibly corresponding to different wavelengths.

In the disclosed embodiments, the depolarization parameter(s) used for quantifying the progression of pregnancy is computed as an average of the individual depolarization parameters computed for each pixel of the region of interest. Alternatively, a weighted average, median etc. of the individual depolarization parameters of the region of interest can be used.

In the disclosed embodiments, an estimated number of weeks of pregnancy is used for quantifying the pregnancy progression, but this is by no means essential. For instance, a depolarization parameter (or any monotone function therefore) may be used by itself to quantify pregnancy progression, and possibly be compared to an expected value corresponding to a normal pregnancy for a same number of weeks of amenorrhea.

In alternative embodiments, the relationship between one or more depolarization parameters and one or more values quantifying the progression of a pregnancy may be expressed by a nonlinear expression, a look-up table, a neural network, a classification algorithm, etc.

The invention may be carried out using apparatuses different from the one described in reference to FIG. 1. It is only required that the apparatus is able to generate polarized light, direct it onto an uterine cervix in vivo, make polarization-sensitive images out of backscattered light and process them; for instance, instead of a colposcope, a simpler polarimetric camera associated with a speculum may be used. The processing may be performed, in whole or in part, remotely. It can be performed in quasi-real time or in deferred time.

Processing is performed by a suitably programmed or configured (the term "configured" including hardware configuring) computer. The term "computer" should be construed in a broad sense, including a general purpose computer, a specialized one based e.g. on one or more Digital Signal Processors and/or programmable digital circuits such as FPGA, Application Specific Integrated Circuits etc, an embedded computer, a microcontroller etc, as well as a computer system involving several of the above devices interconnected by a computer network. The computer may even involve analog processing circuits, even if wholly-digital embodiments are usually preferred.

The invention claimed is:

1. A method of quantifying progression of pregnancy in a pregnant female mammal, comprising the following steps:
a) illuminating the uterine cervix (CX) of the pregnant female mammal with polarized light (POR) having a wavelength comprised between 600 and 1100 nm;
b) acquiring a plurality of images of the illuminated uterine cervix through a polarization state analyser (PSA) in respective analysing states;
steps a) and b) being performed either once or a plurality of time using polarized light having different polarization states;
c) from the acquired images, computing at least one depolarization parameter over a region of interest of the uterine cervix; and
d) quantifying the progression of the pregnancy from said depolarization parameter,
wherein the depolarization parameter is chosen among:
total depolarization;
linear depolarization;
circular depolarization;
depolarization index;
an eigenvalue of a coherence matrix;
polarimetric entropy;
polarimetric purity index $P_1$; and
a function of one or more of the above parameters.

2. The method of claim 1, wherein:
steps a) and b) are performed at least four times, successively using polarized light having four independent polarization states;
step b) comprises acquiring, for each one of said polarization states, at least four images corresponding to four independent analysing states of the polarization analyser; and
step c) comprises determining, from the acquired images, a Mueller matrix of the region of interest, and computing the depolarization parameter from said Mueller matrix.

3. The method of claim 2, wherein step c) comprising decomposing the Mueller matrix into a product of a plurality of matrices including a depolarization matrix, and computing the depolarization parameter from said depolarization matrix.

4. The method of claim 1, wherein step c) comprises determining a Stokes vector of light backscattered from the region of interest, and computing the depolarization parameter from said Stokes vector.

5. The method of claim 4, wherein the depolarization parameter is chosen among:
an orthogonal state contrast;
a linear degree of polarization; and
a function of one or more of the above parameters.

6. The method of claim 1, wherein step d) comprises determining an equivalent number of amenorrhea weeks as a linear function from said depolarization parameter.

7. The method of claim 1, wherein steps c) and d) are carried out by computer (CP).

8. The method of claim 1, wherein the pregnant female mammal is a human female.

9. An apparatus for quantifying the progression of a pregnancy in a pregnant female mammal, comprising:
an imaging device (CS) comprising:
a light source (LS) for illuminating a uterine cervix (CX) with light (OR) having a wavelength comprised between 600 and 1100 nm,
an image sensor (IS) for acquiring an image of the illuminated uterine cervix,
an illumination optical path (OP1) from the light source and the uterine cervix,
an imaging optical path (OP2) between the uterine cervix and the image sensor, the illumination optical path and the imaging optical path being separated from each other over at least one portion thereof, a controllable polarization state generator (PSG) arranged on a portion of the illumination optical path separated from the imaging optical path and a controllable polarization state analyser (PSA) arranged on a portion of the imaging optical path separated from the illumination optical path; and a computer (CP) configured for:

controlling the polarisation state generator, the polarization state analyser and the image sensor in order to illuminate a uterine cervix with said light having one or more polarization states and, for each said polarization state, acquiring a plurality of images of the uterine cervix with the polarization state analyser in a respective analysing state;

computing at least one depolarization parameter over a region of interest of the uterine cervix from the acquired images, and quantifying the progression of the pregnancy from said depolarization parameter.

10. The apparatus according to claim 9, wherein the imaging apparatus comprises a colposcope.

11. A computer program comprising instructions which, when the program is executed by a computer, cause the computer to acquire, from an imaging device, a plurality of images of an uterine cervix, each acquired image being associated to a polarization state of emitting light and to an analysing state of a polarization analyser, to compute at least one depolarization parameter over a region of interest of the uterine cervix from the acquired images, and to quantify the progression of the pregnancy from said depolarization parameter.

* * * * *